(12) United States Patent
Nagata

(10) Patent No.: US 6,543,918 B1
(45) Date of Patent: Apr. 8, 2003

(54) FIXING STRUCTURE OF ROOM LAMP FOR VEHICLE

(75) Inventor: Satoshi Nagata, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 09/620,577

(22) Filed: Jul. 20, 2000

(30) Foreign Application Priority Data

Jul. 22, 1999 (JP) ............................. 11-207800
Sep. 29, 1999 (JP) ............................. 11-276673

(51) Int. Cl.[7] ................................. B60Q 1/00
(52) U.S. Cl. ..................... 362/488; 362/490; 362/493; 362/479; 362/549; 362/150
(58) Field of Search ................. 362/488, 490, 362/493, 549, 150, 364, 147, 479, 365; 296/146.7, 96.26, 210, 100.16, 100.17

(56) References Cited

U.S. PATENT DOCUMENTS

| | | | | |
|---|---|---|---|---|
| 5,149,187 A | * | 9/1992 | Matsuno et al. | 362/80 |
| 5,217,291 A | * | 6/1993 | Meyer | 362/66 |
| 5,342,107 A | * | 8/1994 | Saji et al. | 296/210 |
| 5,508,897 A | * | 4/1996 | Van Order | 362/490 |
| 6,003,928 A | * | 12/1999 | Curtindale | 296/214 |

* cited by examiner

Primary Examiner—Sandra O'Shea
Assistant Examiner—Bertrand Zeade
(74) Attorney, Agent, or Firm—Foley & Lardner

(57) ABSTRACT

A first fixing means is for fixing a room lamp and a roof trim with each other and is provided to the room lamp and the roof trim. A second fixing means is for fixing the room lamp and a roof framework with each other with the roof trim being interposed between the room lamp and the roof framework, and is provided to the room lamp and the room trim.

19 Claims, 31 Drawing Sheets

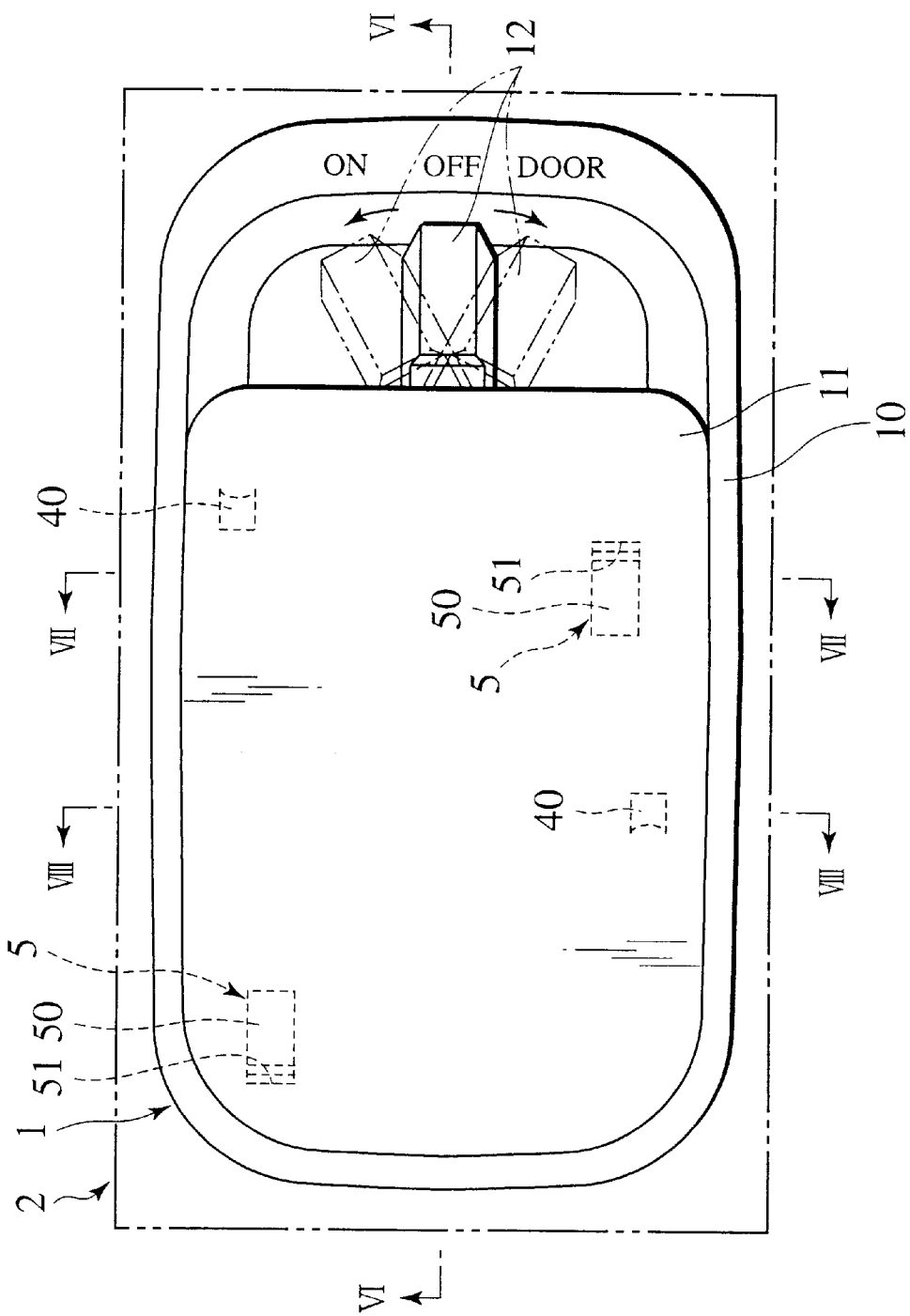

FIXING STRUCTURE OF ROOM LAMP FOR VEHICLE

BACKGROUND OF THE INVENTION

1. Field of the Invention

The present invention relates to a fixing structure of a room lamp and particularly to a fixing structure of a room lamp by which a roof trim and a room lamp can be simultaneously fixed to a roof framework of a vehicle body and the number of man-hours required for assembly (fixing) on an assembly line of an automobile can be reduce.

2. Description of Relevant Art

A relevant-art fixing structure of a room lamp is provided to a room lamp and a roof framework of a vehicle body and is formed of fixing means for fixing the room lamp and the roof framework to each other in general. Fixing of the room lamp by the above prior-art fixing structure includes fixing of the roof trim to the roof framework of the vehicle body, and then, fixing of the room lamp to the roof framework by using the above fixing means on an assembly line of an automobile.

SUMMARY OF THE INVENTION

However, the above relevant-art fixing structure of the room lamp is formed of the fixing means for fixing the room lamp and the roof framework to each other and is formed separately from fixing means for fixing the roof framework and the roof trim to each other. Therefore, fixing of the roof framework and the roof trim to each other and fixing of the roof framework and the room lamp to each other are carried out separately on the assembly line of the automobile, which creates a problem of the number of man-hours required for assembly on the assembly line of the automobile.

It is an object of the present invention to provide a fixing structure of a room lamp by which a roof trim and a room lamp can be simultaneously fixed to a roof framework of a vehicle body, the number of man-hours required for assembly on an assembly line of an automobile can be reduced, and reliable fixing can be obtained.

To achieve the object, a first aspect of the invention provides a fixing structure of a room lamp for a vehicle. A first locking mechanism or fixing means is for fixing a room lamp and a roof trim with each other. The first fixing means is provided to the room lamp and the roof trim. A second locking mechanism or fixing means is for fixing the room lamp and a roof framework with each other with the roof trim being interposed between the room lamp and the roof framework. The second fixing means is provided to the room lamp and the roof trim. The roof trim and the room lamp are simultaneously fixed to the roof framework.

Preferably, the second fixing means has a resilient member fixed to the room lamp; and a through-hole part defined by the roof framework. The resilient member is for tolerating a positional displacement between the through-hole part and itself.

Preferably, the resilient member is formed of a conductive plate material, is insert molded to a lamp housing of the room lamp and a resilient and conductive plate member, the plate member comprises one of the resilient member, a holder part, a connector terminal part, a fixed contact part, a wiring part, a shade part, and a reflecting part.

Preferably, a pair of second fixing means are positioned diagonally in the room lamp.

Preferably, the first fixing means has an engagement pawl integrally provided to the room lamp; and an engagement hole provided to the roof trim.

Preferably, the first fixing means and the second fixing means each are positioned in a vicinity of a switching knob of the room lamp.

Preferably, the second fixing means has a resilient member provided to the room lamp and a stopper; and a fixing part provided to the roof framework. The resilient member has a pawl part to be brought in contact with the fixing part to be resiliently engaged therewith for fixing the room lamp and the roof framework with each other. The resilient member has a first resilient part to be deformed. The first resilient part is to pivot on a first fulcrum and between a first state and a second state to be deformed, the first state where the pawl part of the resilient member in a normal state is brought in contact with the fixing part to be resiliently engaged therewith, the second state where the resilient member is abutted against the stopper. The resilient member has a second resilient part to be deformed. The second resilient part is to rotate about a second fulcrum and between the second state and a third state to be deformed, the third state where the pawl part is to be inserted in the fixing part. The resilient member has an operation part for resiliently deforming the first resilient part and the second resilient part. The pawl part and the fixing part have a clearance therebetween for tolerating a positional displacement therebetween.

Preferably, the resilient member is insert molded in a housing of the room lamp with a holder part, a connector terminal part, a fixed contact part, a wiring part, and a reflecting plate part. The resilient member is formed of a resilient and conductive metal plate. The resilient member is formed by stamping with one of the holder part, the connector terminal part, the fixed contact part, the wiring part, and the reflecting plate part after insert molding.

Preferably, the roof trim has a recessed part for accommodating the room lamp, and the room lamp has a pawl for latching with a side of the recessed part.

Preferably, the roof trim has a recessed part for accommodating the room lamp, and the room lamp has a resilient part to be resiliently brought in contact with a bottom of the recessed part under pressure for pressing the pawl part of the resilient member and the fixing part with each other.

Preferably, the first fixing means has an engagement part provided to the roof trim; and an engagement pawl fixed to the room lamp. The engagement pawl is locked with the engagement part for fixing the room lamp and the roof trim with each other. The engagement pawl and the engagement part having a clearance therebetween for tolerating a positional displacement therebetween.

Preferably, the second fixing has a second engagement part provided to the roof frame; and a second latch member fixed to the room lamp. The second latch member is to be inserted in the second engagement part for locking. The second latch member has a pawl part for locking with the second engagement part. The second latch member has a first part to be deformed. The first part has a proximal end on the room ramp. The first part extends from the proximal end in an oblique direction relative to an insertion direction of the second latch member. The first part is to pivot on the proximal end for releasing the pawl part from the second engagement part. The second latch member has a second part to be deformed. The second part extends from a distal end of the first part to the pawl part. The second part is to rotate for positioning the pawl part off the second engagement part of the roof frame in a crossing direction relative to the insertion direction.

Preferably, the second fixing means has a stopper extending from the room lamp in the insertion direction. The stopper is for the first part to be abutted against for stopping to rotate the first part.

Preferably, the pawl part and the second engagement part have a second clearance therebetween for tolerating a second positional displacement therebetween in a crossing direction to the insertion direction of the second latch member.

Preferably, the second latch member has an operation part extending from the pawl part. The operation part is for pivoting the first part and rotating the second part.

Preferably, the first fixing means has a first engagement part provided to the roof trim; and a first latch member fixed to the room lamp. The first latch member is to be inserted in the roof trim for locking with the first engagement part. The first engagement part and the first latch member have a first clearance therebetween for tolerating a first positional displacement therebetween in a crossing direction relative to an insertion direction of the first latch member.

A second aspect of the invention provides a fixing method of a room lamp. A room lamp and a roof trim are fixed with each other. The room lamp and a roof framework are fixed with each other with the roof trim being interposed between the room lamp and the roof framework.

As a result, in the fixing structure of the room lamp of the invention, the room lamp and the roof trim are fixed to each other by first fixing means before supplying to the assembly line of the automobile. Then, the fixed room lamp and the roof trim are supplied to the assembly line of the automobile. Resilient members on the room lamp are brought into resilient contact with edges of through-hole part on the roof framework to fix the room lamp to the roof framework by second fixing means. Thus, it is possible to simultaneously fix the roof trim and the room lamp to the roof framework on the assembly line of the automobile. Therefore, it is possible to reduce the number of the man-hours required for assembly on the assembly line of the automobile.

Further, in the fixing structure of the room lamp of the invention, by the two fulcrums, that is, the first fulcrum and the second fulcrum and the two resilient parts to be deformed, that is, the first resilient part and the second resilient part, it is easy to attach and detach the room lamp and the roof trim to and from the roof framework. In other words, if the operation part is operated when the resilient member is in the first state, the first resilient part and the second resilient part are respectively and resiliently deformed about the first fulcrum and the second fulcrum as the rotation centers and the resilient member in the first state is brought into the second state and then into the third state. When the resilient member is in the third state, the pawl part can be easily set into or pulled out of the fixing part. If the operation of the above operation part is stopped in a state in which the pawl part has been set into the fixing part or pulled out of the fixing part, the first resilient part and the second resilient part respectively and resiliently return about the first fulcrum and the second fulcrum as the rotation centers. Thus, the spring in the third state is brought into the second state and then into the first state such that the pawl part is resiliently engaged with and comes into contact with the fixing part to simultaneously fix the room lamp and the roof trim to the roof framework. The spring is brought into the normal state such that the room lamp and the roof trim can be simultaneously detached from the roof framework. As described above, it is easy to attach and detach the room lamp and the roof trim to and from the roof framework.

Furthermore, since a displacement between the pawl part and the fixing part can be tolerated by a clearance provided between the pawl part and the fixing part, it is possible to tolerate dimensional variation of the second fixing means.

BRIEF DESCRIPTION OF THE DRAWINGS

FIG. 5 is a view taken in a direction of an arrow IV in FIG. 4A;

DETAILED DESCRIPTION OF PREFERRED EMBODIMENTS

An embodiment of a fixing structure of a room lamp of the present invention will be described below by reference to the accompanying drawings.

First Embodiment

Figure 1:
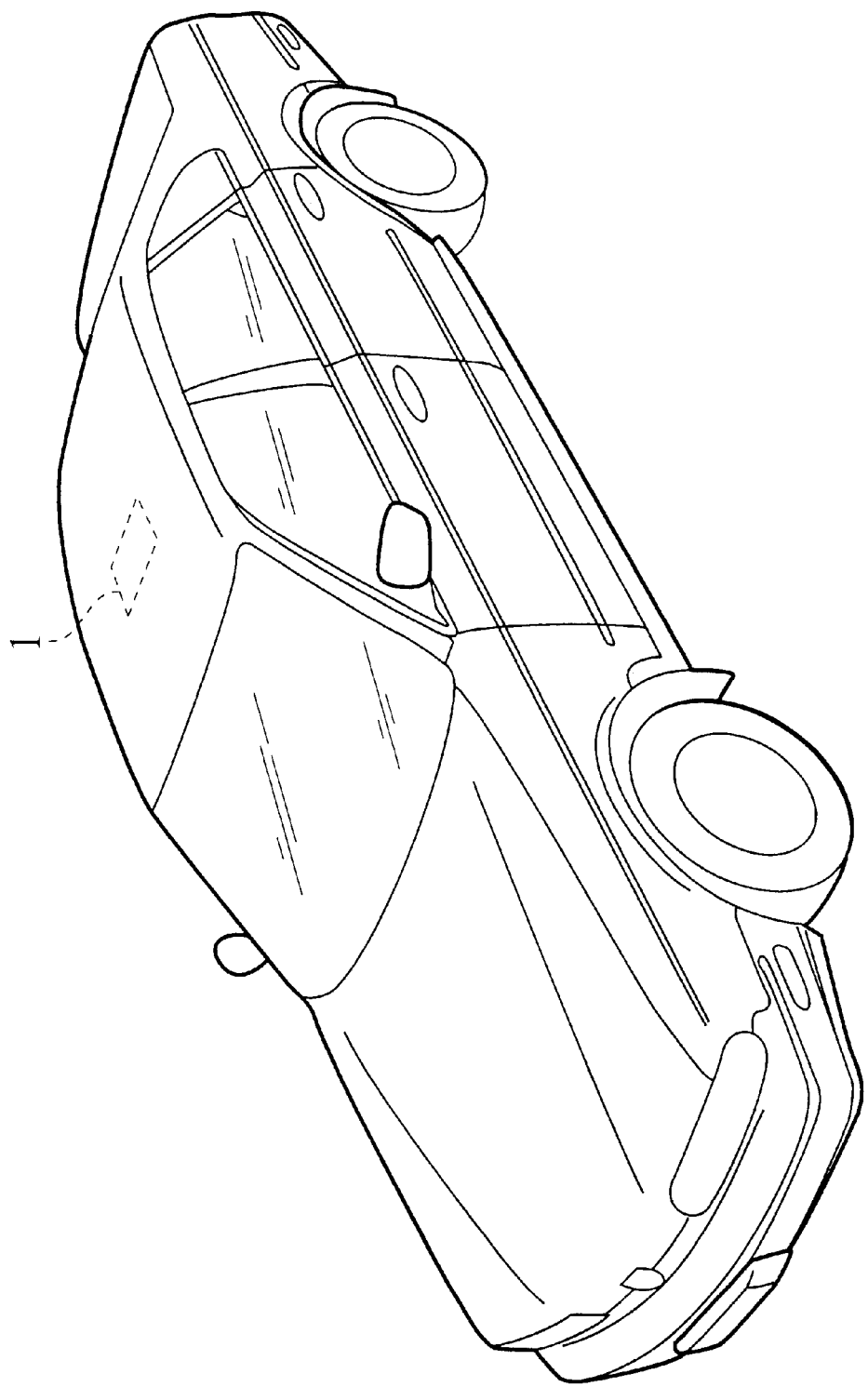
FIG. 1 is a perspective view showing an automobile to which a fixing structure of a room lamp of an embodiment according to the invention is adapted.

A room lamp 1 is assembled to an automobile as shown in FIG. 1.

The room lamp 1 is formed of a lamp housing 10, a lens 11, a switching knob 12, and a light bulb 13 as shown in FIGS. 5 to 9.

The above lamp housing 10 is formed of an insulating member made of synthetic resin or the like and a plurality of (three, in this example) metal plates 14, 15, and 16 are insert-molded. In the lamp housing 10, as sown in FIG. 6, respective opening parts 100 are provided to positions where two springs 50 of primary fixing means 5 which will be described later are positioned, a position where the light valve 13, holder parts 150 and 160 which will be described later, and a reflecting plate part 146 which will be described later are positioned, and positions where two jumper cut parts 147 which will be described later are positioned.

The above three metal plates 14, 15, and 16 are formed of plate material having resiliency and electrical conductivity and have the two springs 50, the two holder parts 150 and 160 for detachably holding the light bulb 13, three connector terminal parts (an electric source connector terminal part 140, a door connector terminal part 141, and an earth connector terminal part 151) electrically and detachably connected to a connector terminal (not shown, a connector terminal of a connector to which an electric source such as a battery of the automobile, an electric source linked with opening and closing of the door, and an earth are connected respectively and electrically) of a connector on an electric source side, three fixed contact parts (a first fixed contact part 161, a second fixed contact part 142, and a third fixed contact part 143) electrically connected to each other to form predetermined electric circuits which will be described later by switching of a movable contact ball 120 of the switching knob 12, wiring parts (a first wiring part 144, a second wiring part 145, a third wiring part 152, and a fourth wiring part 162) for carrying out wiring between the holder parts 150 and 160, the connector terminal parts 140, 141, and 151, and the fixed contact parts 161, 142, and 143, and a shade part and/or the reflecting plate part 146 (hereafter, merely referred to as a reflecting plate part).

In the above three metal plates 14, 15, and 16, it is not true that each of the metal plate 14, 15, and 16 has the holder parts 150 and 160, the connector terminal parts 140, 141, and 151, the fixed contact parts 161, 142, and 143, the wiring parts 144, 145, 152, and 162, and the reflecting plate part 146. All of the three metal plates 14, 15, and 16 have the holder parts 150 and 160, the connector terminal parts 140, 141, and 151, the fixed contact parts 161, 142, and 143, the wiring parts 144, 145, 152, and 162, and the reflecting plate part 146.

Figure 12:
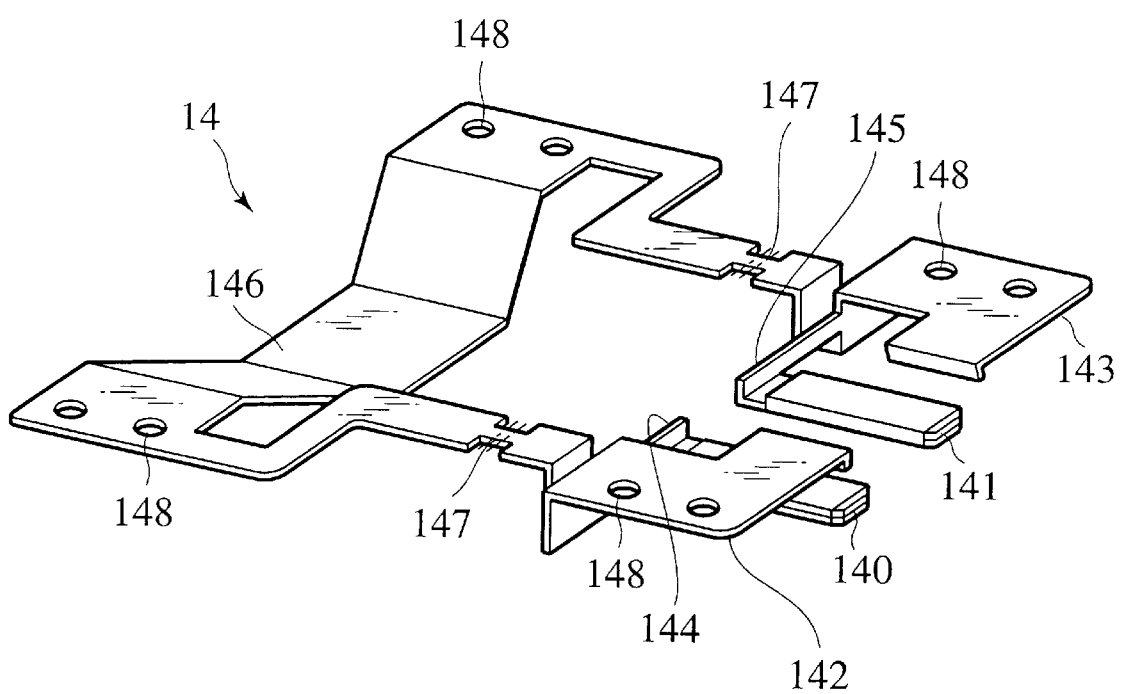
FIG. 12 is a perspective view of a first metal plate.

In other words, as shown in FIG. 12, the first metal plate 14 is formed of the electric source connector terminal part 140, the door connector terminal part 141, the second fixed contact part 142, the third fixed contact part 143, the first wiring part 144, the second wiring part 145, the reflecting plate part 146, and the two jumper cut parts 147. The two jumper cut parts 147 are parts to be cut in insert molding for separating a side of the electric source connector terminal part 140, the door connector terminal part 141, the second fixed contact part 142, the third fixed contact part 143, the first wiring part 144, and the second wiring part 145 and a side of the reflecting plate part 146 of the first metal plate 14 from each other. By forming a structure to be electrically interrupted as described above, it is possible to reduce the number of parts and cost.

Figure 13:
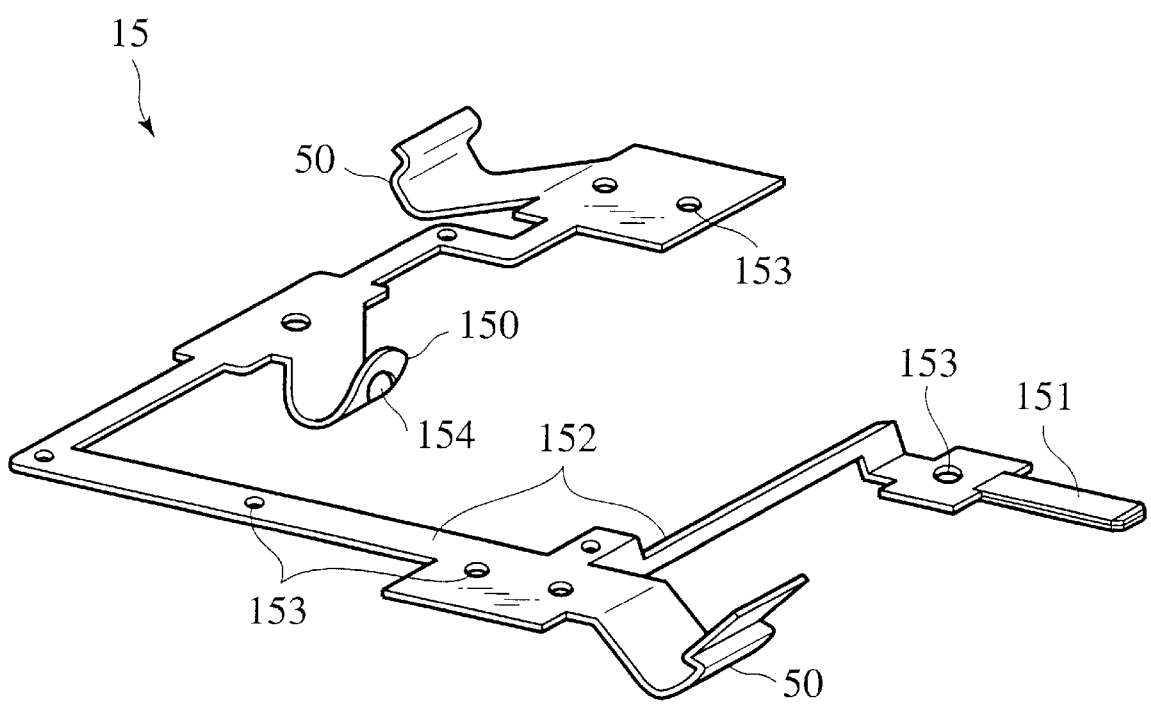
FIG. 13 is a perspective view of a second metal plate.

The second metal plate 15 is formed of the spring 50, the holder part 150, the earth connector terminal part 151, and the third wiring part 152 as shown in FIG. 13.

Figure 14:
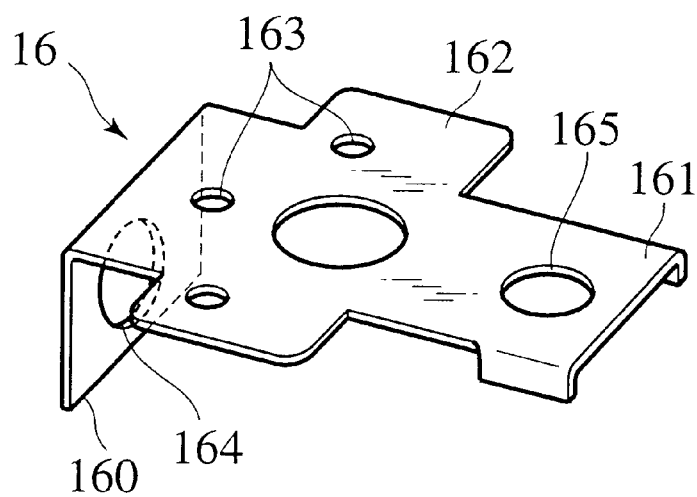
FIG. 14 is a perspective view of a third metal plate.

The third metal plate 16 is formed of the holder part 160, the first fixed contact part 161, and the fourth wiring part 162 as shown in FIG. 14.

The above metal plates 14, 15, and 16 are provided with small through holes 148, 153, and 163 in which resin is engaged. The holder parts 150 and 160 are provided with fitting holes 154 and 164 in which the light bulb 13 fits in. Moreover, the first fixed contact part 161 is provided with a fitting groove 165 in which the movable contact ball 120 fits.

Figure 7:
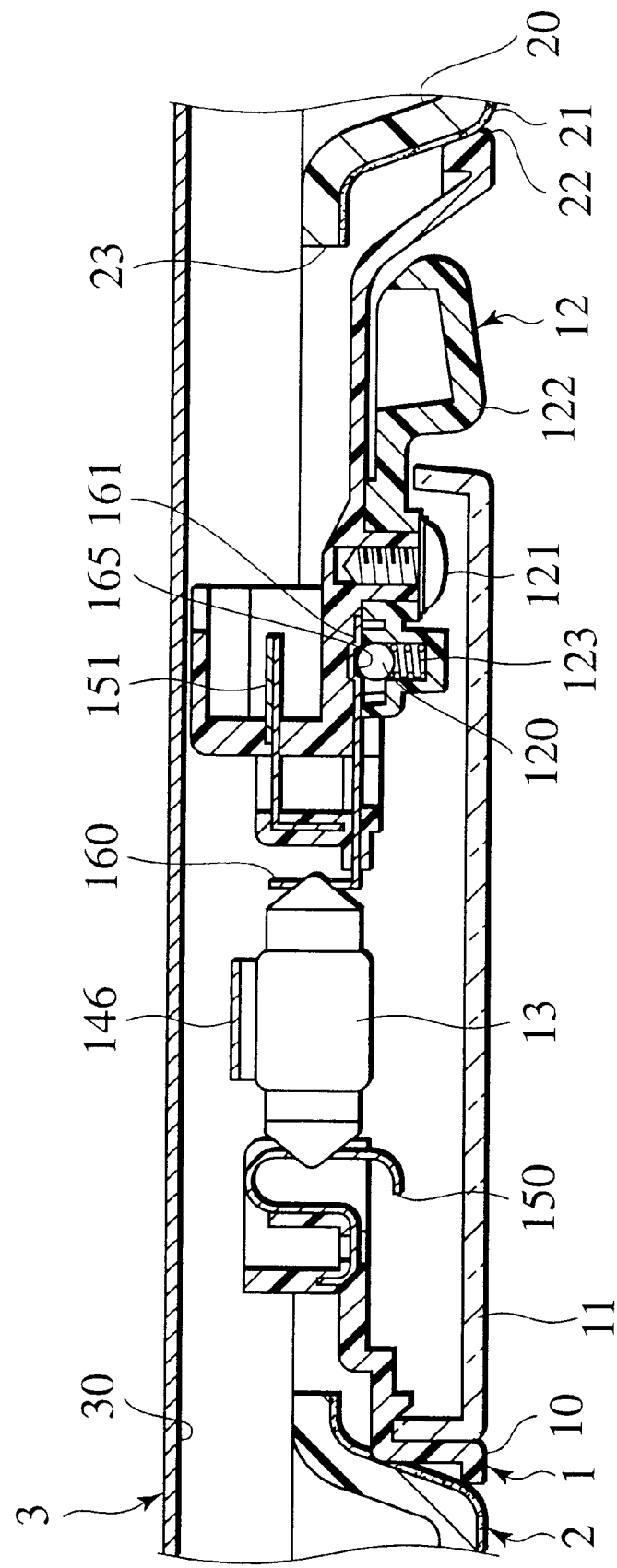
FIG. 7 is a sectional view taken along a line VI—VI in FIG. 5.
Figure 8:
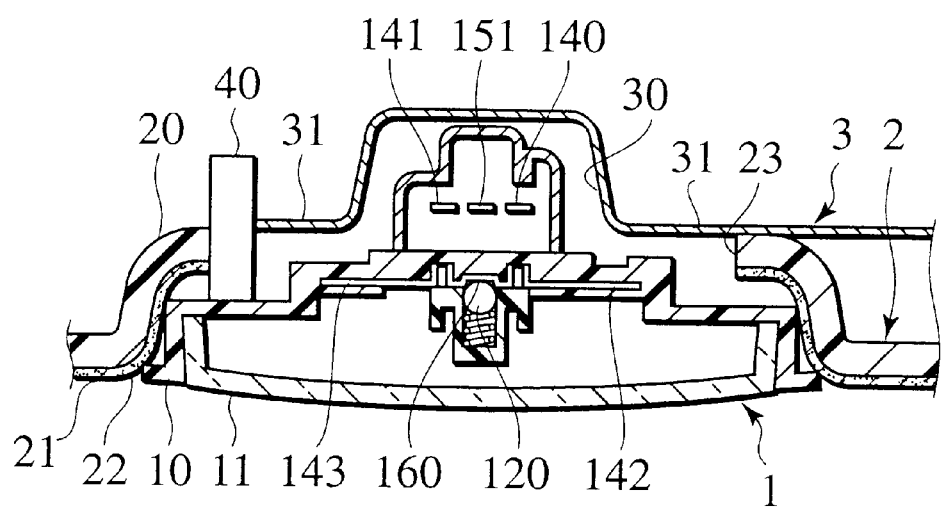
FIG. 8 is a sectional view taken along a line VII—VII in FIG. 5.
Figure 9:
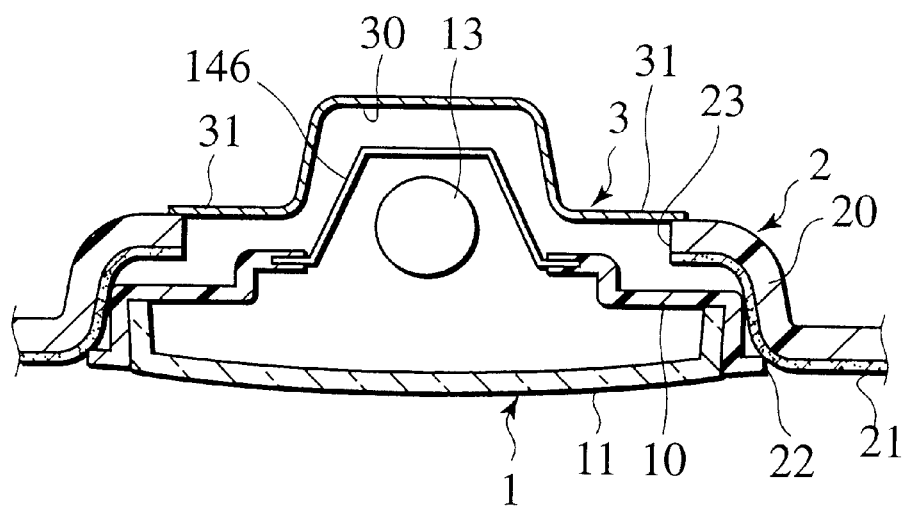
FIG. 9 is a sectional view taken along a line VIII—VIII in FIG. 5.

The above lens 11 is detachably mounted to a lower face (a lower face when the room lamp 1 is fixed to a roof in a vehicle) of the lamp housing 10 as shown in FIGS. 7 to 9. The above switching knob 12 is rotatably mounted to the lower face of the lamp housing 10 by a screw 121 as shown in FIG. 7. A knob end part 122 of the switching knob 12 projects to an outside from the lens 11. On the other hand, to an end part of the switching knob 12 on a side opposite to the knob end part 122, the above movable contact ball 120 is mounted through a spring 123. The above light bulb 13 is detachably held by the holder parts 150 and 160 as similarly shown in FIG. 7.

Figure 10:
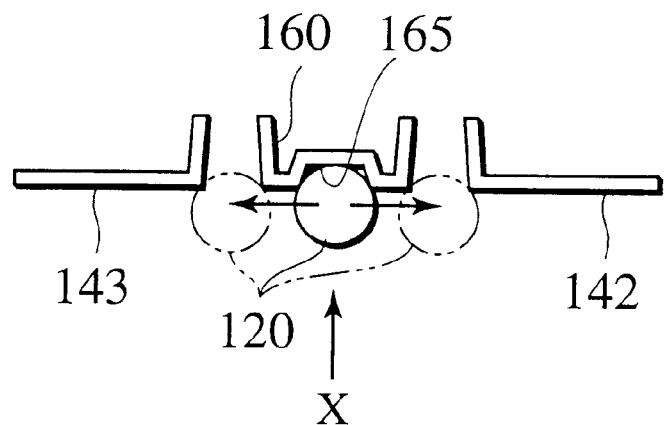
FIG. 10 is a front explanatory view showing a contact state of movable contact ball and a fixed contact.
Figure 11:
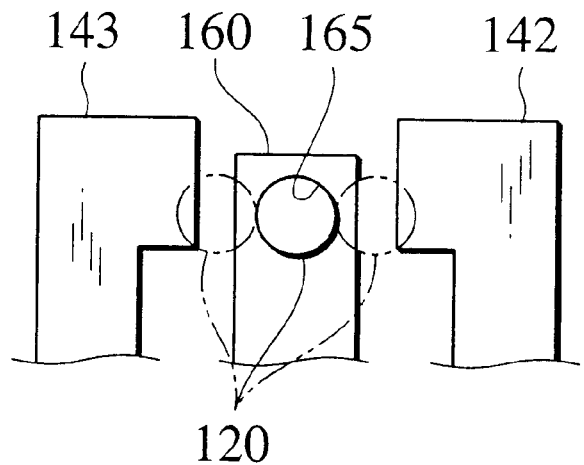
FIG. 11 is a view taken in a direction of an arrow X in FIG. 10.

As shown in FIGS. 5, 10, and 11, if the switching knob 12 is positioned in an "OFF" position, the movable contact ball 120 fits in the fitting groove 165 of the first fixed contact part 161. Therefore, the electric circuit is in an OFF state and the light bulb 13 is out. If the switching knob 12 is switched to an "ON" position, the movable contact ball 120 moves out of the fitting groove 165 and lies astride the first fixed contact part 161 and the second fixed contact part 142 to connect them. Therefore, the electric circuit is brought into an ON state and the light bulb 13 comes on. If the switching knob 12 is switched to a "DOOR" position, the movable contact ball 120 similarly moves out of the fitting groove 165 and lies astride the first fixed contact part 161 and the third fixed contact part 143 to connect them. Therefore, an electric circuit is formed through a door. In this sate, if the door is closed, the electric circuit is in an OFF state and the light bulb 13 is out. On the other hand, if the door is opened, the electric circuit is brought into an ON state and the light bulb 13 comes on. In this manner, by switching the switching knob 12, the movable contact ball 120 is switched and the above predetermined electric circuits are formed.

Figure 2:
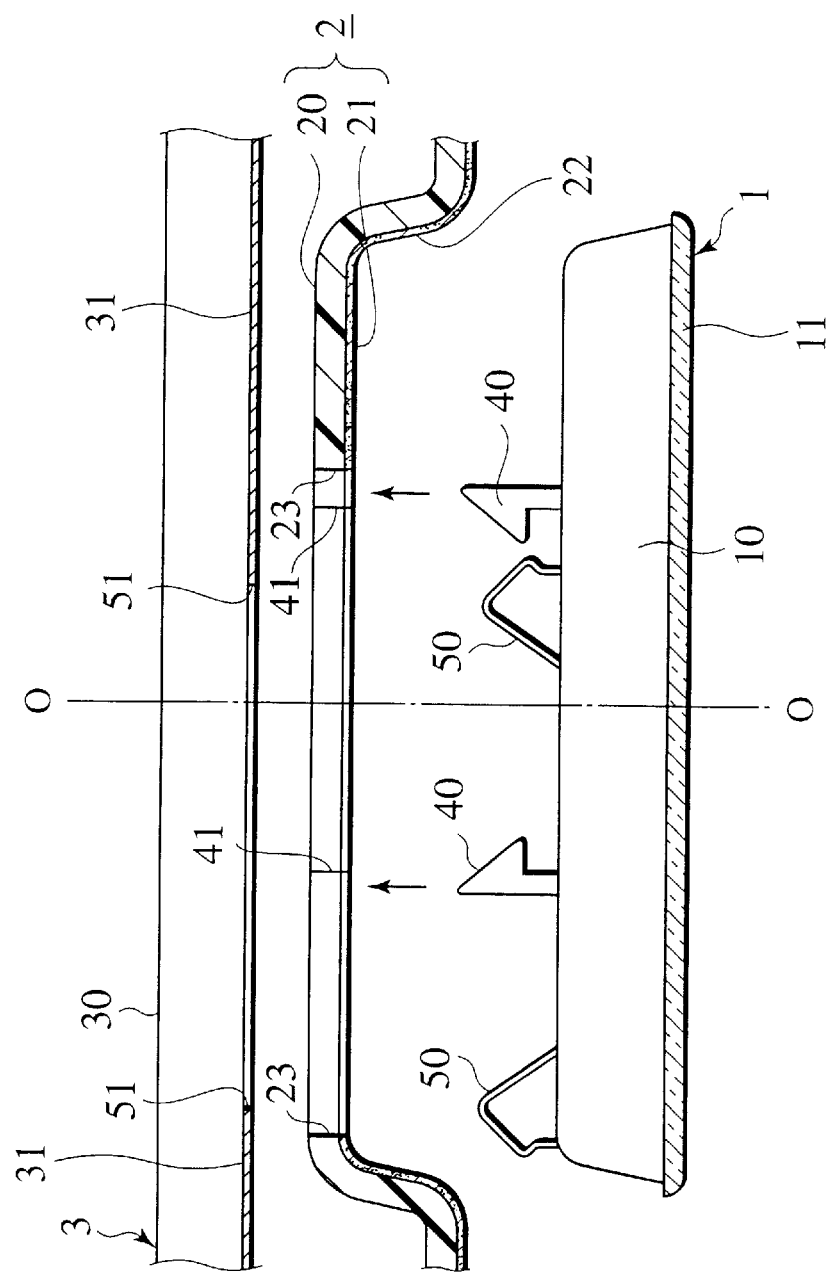
FIG. 2 is a vertical sectional view showing a fixing structure of a room lamp of an embodiment of the present invention and showing a state before fixing of the room lamp, a roof trim and a roof framework.
Figure 3:
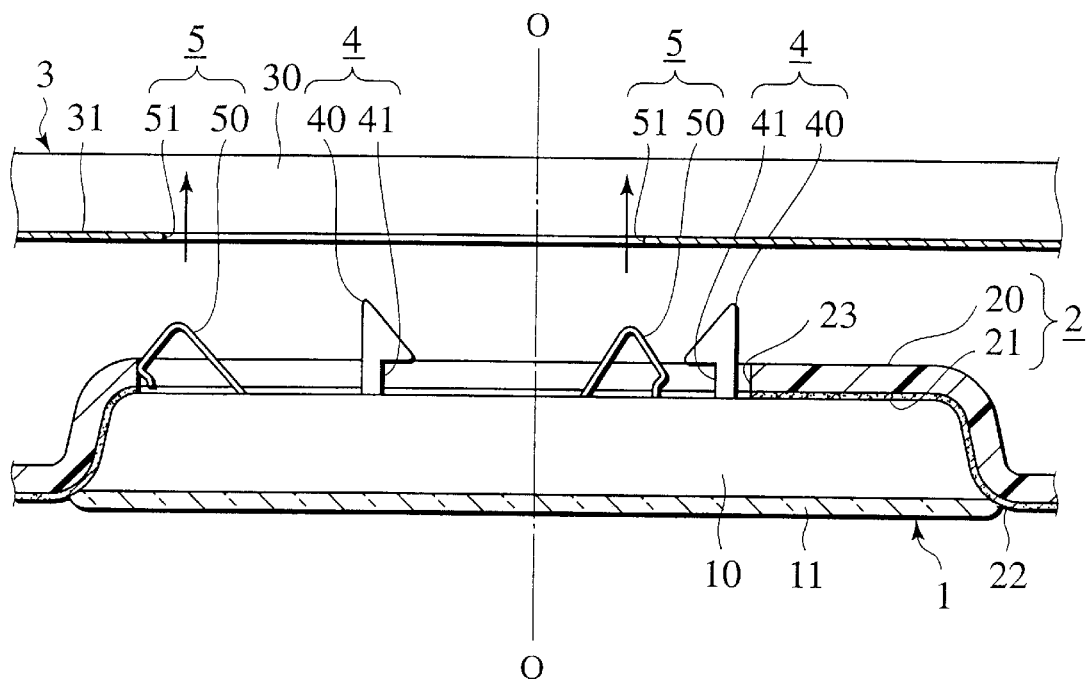
FIG. 3 is a vertical sectional view showing a state of provisional fixing of the room lamp and the roof trim to each other.

As shown in FIGS. 2 to 4, the roof trim 2 is mounted tautly to the roof in a room of the automobile and is formed of a base member 20 such as foamed urethane, for example, and a covering member 21 such as felt, for example, mounted tautly to a lower face of the base member 20. To a position of the roof trim 2 where the above room lamp 1 is set, a recessed part 22 for housing the room lamp is formed to be recessed upward. To a bottom part of the recessed part 22 of the roof trim 2, an opening part 23 is provided. The opening part 23 is provided such that the opening part 23 does not hinder fixing of the two springs 50 which will be described later and edges of fixing through holes 51 of the roof framework 3 which will be described later to each other.

As shown in FIGS. 2 to 4, in the roof framework 3, a recessed part 30 recessed upward at an intermediate part by presswork and the like and horizontal parts 31 on left and right opposite sides are respectively formed to extend in a longitudinal direction. The horizontal parts 31 of the roof framework 3 are provided such that two engagement pawls 40 of provisional fixing means 4 which will be described later and the roof framework 3 do not interfere with each other when the room lamp 1 and the roof trim 2 provisionally fixed to each other by the provisional fixing means 4 which will be described later are primarily fixed to the roof framework 3 (see FIG. 8).

As shown in FIGS. 2 to 4, the room lamp 1 and the roof trim 2 are provided with the provisional fixing means 4 by which the room lamp 1 and the roof trim 2 are provisionally fixed to each other. The provisional fixing means 4 is formed of the engagement pawl 40 provided to the room lamp 1 and an engaged cut 41 provided to an edge of the opening part 23 of the roof trim 2. In FIGS. 2 to 4, although hatching of a section of the roof trim 2 is omitted, the engagement pawl 40 engages in the engaged cut 41 which is − or + shaped when viewed from above or below in actuality. The provisional fixing means 4 are provided in two positions in a vicinity of the switching knob 12 and in a position some distance from the switching knob 12.

Figure 16:
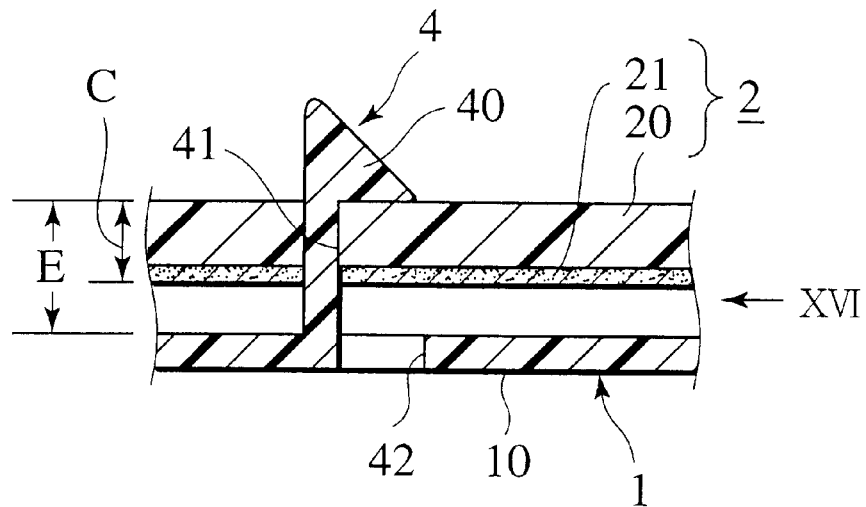
FIG. 16 is a partially enlarged vertical sectional view showing a state of provisional fixing of provisional fixing means.
Figure 17:
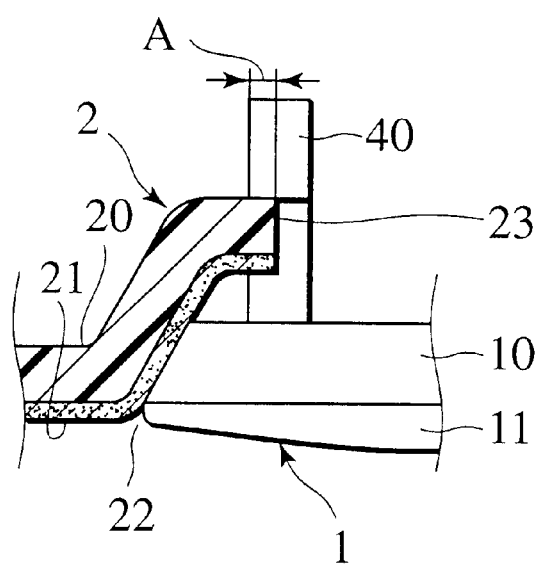
FIG. 17 is a view taken in a direction of an arrow XVI in FIG. 16.

The engagement pawl 40 is formed integrally to project upward from the lamp housing 10 and the pawl has a lance shape. The engagement pawl 40 has a lap amount of a dimension A with respect to the edge of the opening part 23 of the above roof trim 2 as shown in FIG. 17. With the lap amount A, provisional fixing force to a degree that the room lamp 1 and the roof trim 2 which are provisionally fixed to each other are not easily detached from each other until the room lamp 1 and the roof trim 2 are primarily fixed to the roof framework 3 can be obtained by the provisional fixing means 4. Furthermore, a height B of the engagement pawl 40 is greater than a thickness C of the roof trim 2 such that the edge of the opening part 23 of the roof trim 2 is resiliently deformed to facilitate press fitting of the engagement pawl 40 in press-fitting the engagement pawl 40 into the engaged cut 41 and to make engagement of the engagement pawl 40 reliable. In FIG. 16, a reference numeral 42 designates a through hole through which a molding die is drawn when the engagement pawl 40 is molded integrally to project from the lamp housing 10.

As shown in FIGS. 2 to 4, the room lamp 1 and the roof framework 3 are provided with primary fixing means 5 by which the room lamp 1 provisionally fixed to the roof trim 2 by the provisional fixing means 4 and the roof framework 3 are primarily fixed to each other. The primary fixing means 5 is formed of the spring 50 provided to the room lamp 1 and the fixing through hole 51 provided to the roof framework 3. The primary fixing means 5 are provided to two positions one of which is in a vicinity of the switching knob 12 and the other of which is some distance from the one on a diagonal line.

Figure 15:
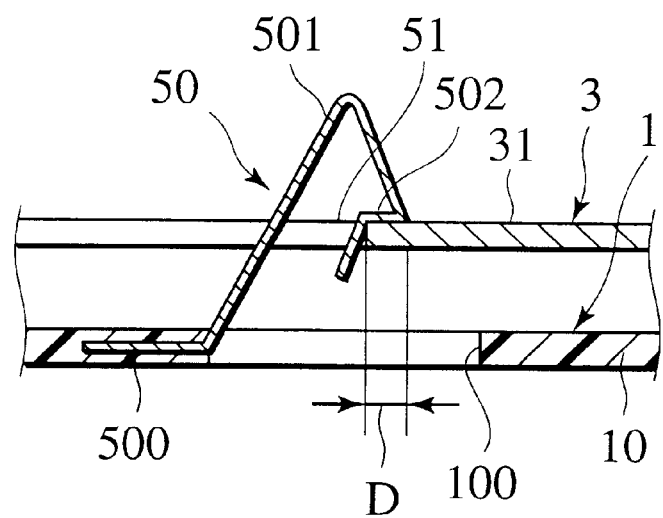
FIG. 15 is a partially enlarged vertical sectional view showing a state of primary fixing of primary fixing means.

The spring 50 is integral with the metal plate 15 and is provided integrally with the lamp housing 10 of the room lamp 1 by insert molding. As shown in FIG. 15, the spring 50 is formed of a buried part 500 buried in the lamp housing 10, a resilient part 501 formed by bending the spring 50 upward from the buried part 500 into a V shape with an obtuse angle and then bending the spring 50 downward into a V shape with an acute angle and an engagement part 502 formed by bending the spring 50 horizontally from the resilient part 501 and then bending the spring 50 downward into a V shape with an obtuse angle. Resiliency of the two springs 50 acts in a longitudinal direction of the room lamp 1.

On the other hand, the fixed through holes 51 are provided to the opposite horizontal parts 30 of the roof framework 3 as shown in FIG. 15. A single fixed through hole 51 may be provided for the above two springs 50 or the fixed through hole 51 may be provided for each of the two springs 50.

The fixing structure of the room lamp of the invention in the present embodiment has the above-described structure. A fixing operation of the room lamp will be described below.

First, before supplying to the assembly line of the automobile, the engagement pawls 40 of the room lamp 1 are engaged by press fitting with the engaged cuts 41 of the roof trim 2 to provisionally fix the room lamp 1 and the roof trim 2 to each other by the provisional fixing means 4 (the engagement pawls 40 and the engaged cuts 41). At this time, the room lamp 1 is housed in the recessed part 22 of the roof trim 2 and the springs 50 of the primary fixing means 5 are positioned at the opening part 23 of the roof trim 2 (see FIGS. 2, 3, 16, and 17).

Then, a roof sub ASSY including the room lamp 1 and the roof trim 2 provisionally fixed to each other by the provisional fixing means 4 is supplied to the assembly line of the automobile. On this assembly line of the automobile, the springs 50 of the room lamp 1 are resiliently engaged with the fixing through holes 51 of the roof framework 3 to primarily fix the room lamp 1 and the roof trim 2 to the roof framework 3 by the primary fixing means 5 (the springs 50 and the fixing through holes 51). At this time, the engagement pawls 40 do not interfere with the horizontal parts 31 of the roof framework 3 (see FIGS. 3, 4, 8, and 15).

As described above, by the fixing structure of the room lamp of the invention in the present embodiment, it is possible to simultaneously fix the roof trim 2 and the room lamp 1 to the roof framework 3 on the assembly line of the automobile. Therefore, it is possible to reduce the number of the man-hours required for assembly on the assembly line of the automobile.

Especially in the present embodiment, because the springs 50 on the room lamp 1 are resiliently engaged with edges of the fixing through holes 51 on the roof framework 3, the engagement part 502 of each the spring 50 is resiliently engaged with the edge of each the fixing through hole 51 through a lap amount D as shown in FIG. 15. Therefore, if there is displacements of the springs 50 on the room lamp 1 and the fixing through holes 51 on the roof framework 3 of the primary fixing means 5 from each other (cumulative tolerances of accuracy of the parts) when the roof sub ASSY including the room lamp 1 and the roof trim 2 provisionally fixed to each other by the provisional fixing means 4, it is possible to tolerate the displacements by the above lap amount D.

Figure 4A:
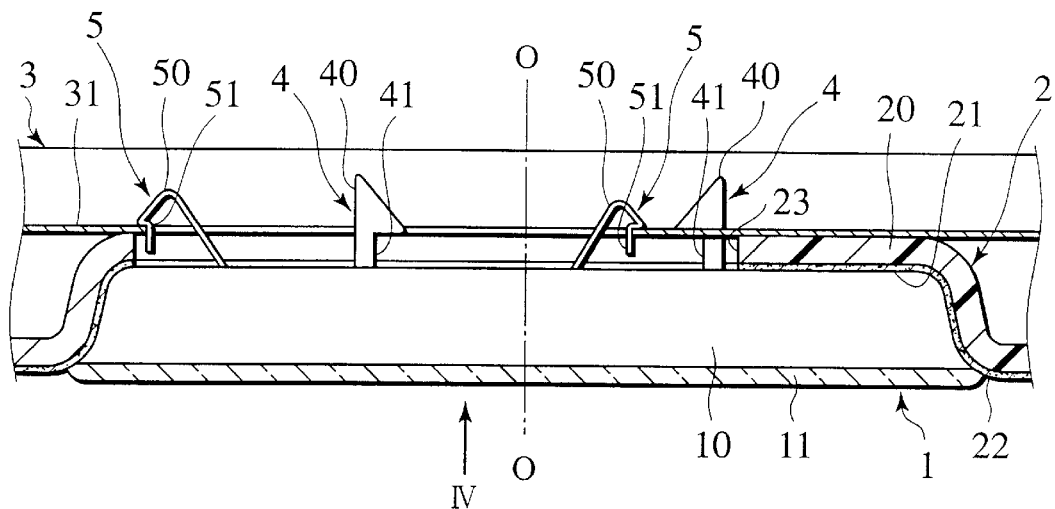
FIG. 4A is a vertical sectional view showing a state of primary fixing of the room lamp and the roof trim to the roof framework.
Figure 4B:
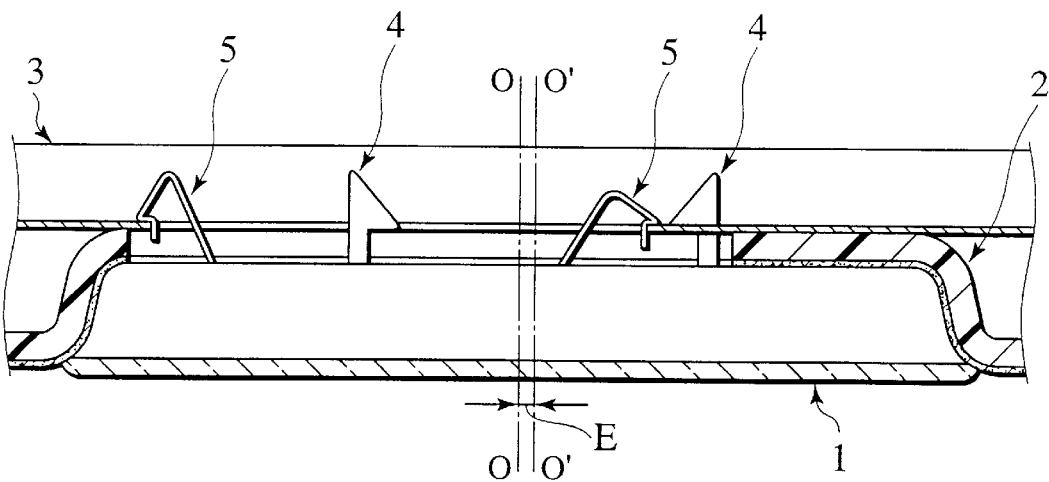
FIG. 4B is a vertical sectional view similarly showing a state of primary fixing of the room lamp and the roof trim to the roof framework in a state in which there is a displacement in a longitudinal direction of the room lamp.
Figure 6:
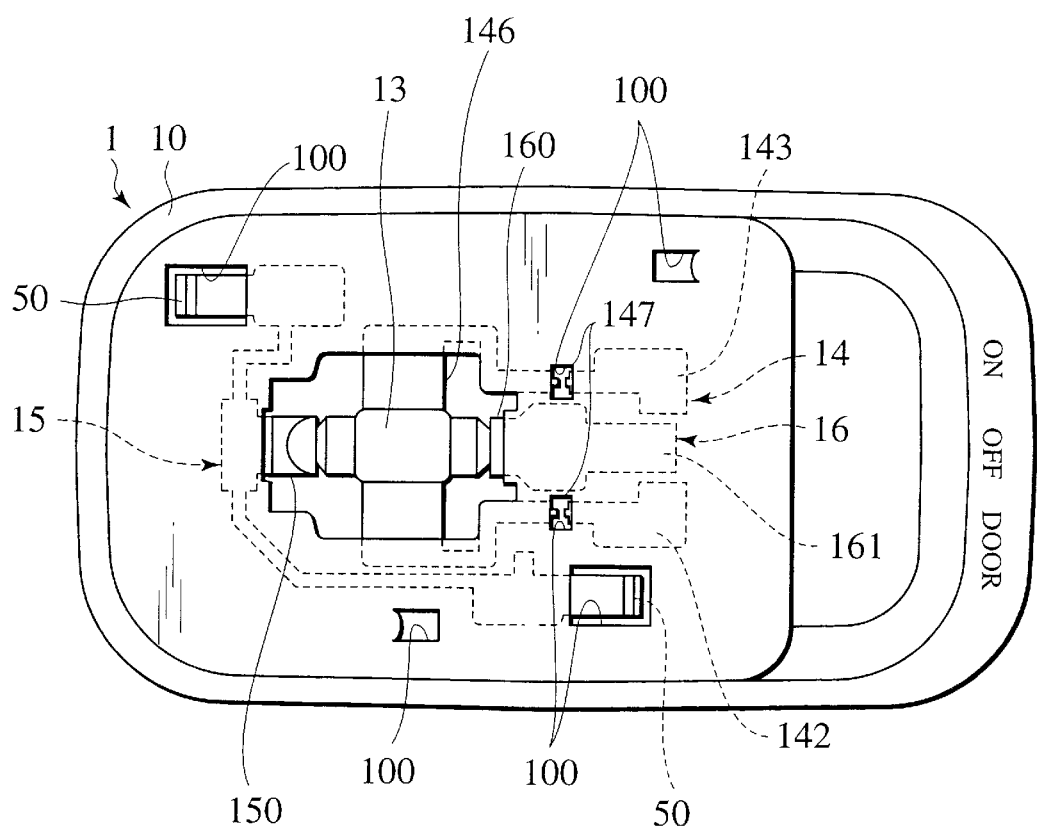
FIG. 6 is a bottom view showing an insert-molded state of three metal plates.

For example, if a fixed position is displaced rightward by a dimension E (a dimension between a center O—O of a fixed state shown in FIG. 4A and a center O'—O' of a fixed state shown in FIG. 4B) as shown in FIG. 4B from a fixed position shown in FIG. 4A, the displacement E can be tolerated by the above lap amount D. Therefore, the springs 50 are not detached from the edges of the fixing through holes 51 and it is possible to reliably fix the room lamp 1 and the roof trim 2 to the roof framework 3. At this time, bent amounts of the left and right springs 50 change and the above lap amounts D also change.

Although the above displacement of the room lamp 1 and the roof framework 3 from each other is in the longitudinal direction of the room lamp 1, a displacement in a width direction of the room lamp 1 and a displacement about a vertical axis in addition to the longitudinal displacement can be tolerate sufficiently. For example, a width of each the spring 50 is set at a smaller value than a width of each the fixing through hole 51.

Because the one provisional fixing means 4 and the one primary fixing means 5 are provided in the vicinity of the switching knob 12, a length of an arm of rotation moment between the provisional fixing means 4 and primary fixing means 5, and the switching knob 12 is small. As a result, the fixed state of the room lamp 1, the roof trim 2, and the roof framework 3 to each other can sufficiently resist impact of switching operation of the switching knob 12.

Figure 18:
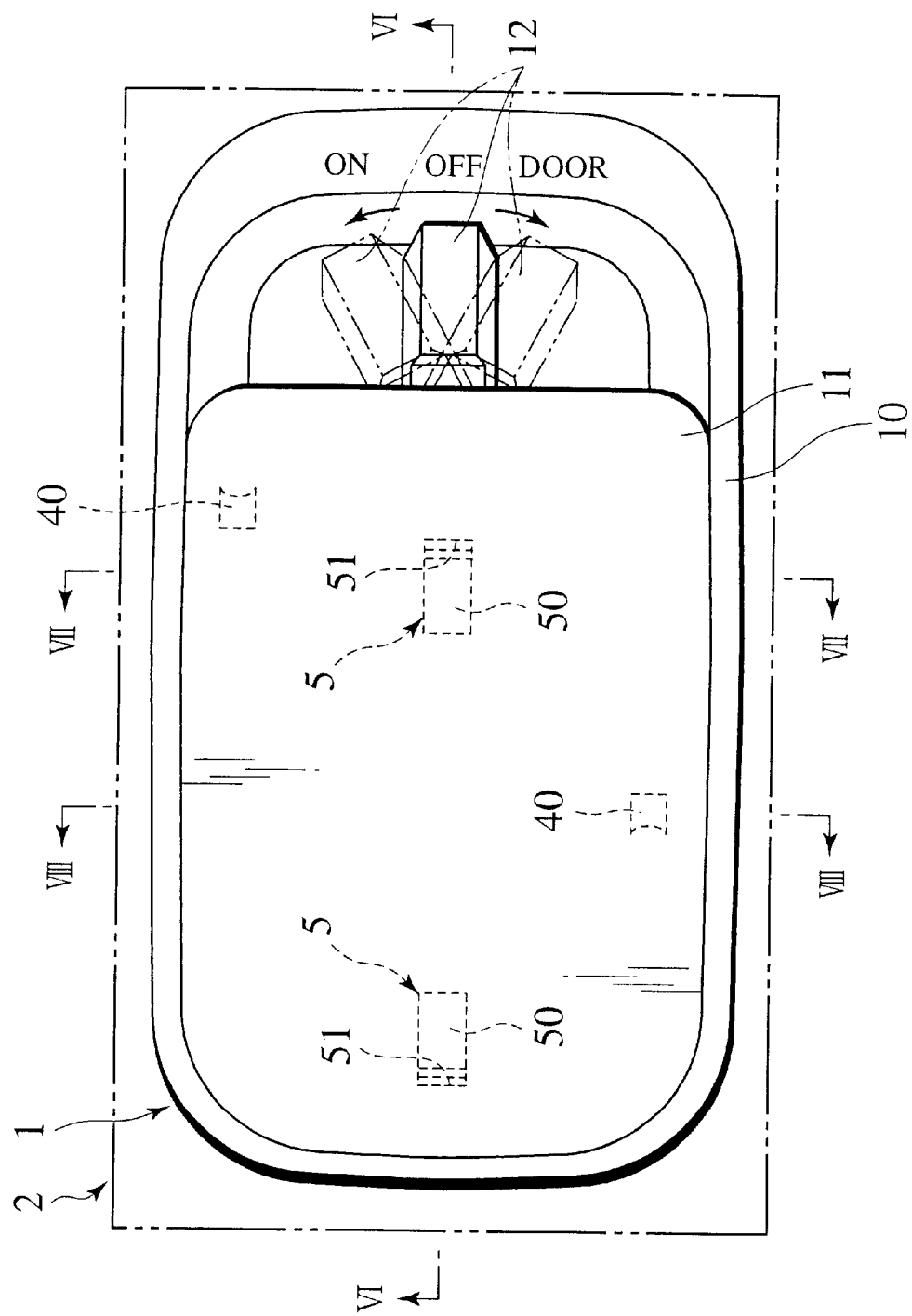
FIG. 18 is a plan view of a room lamp according to a second embodiment.
Figure 19:
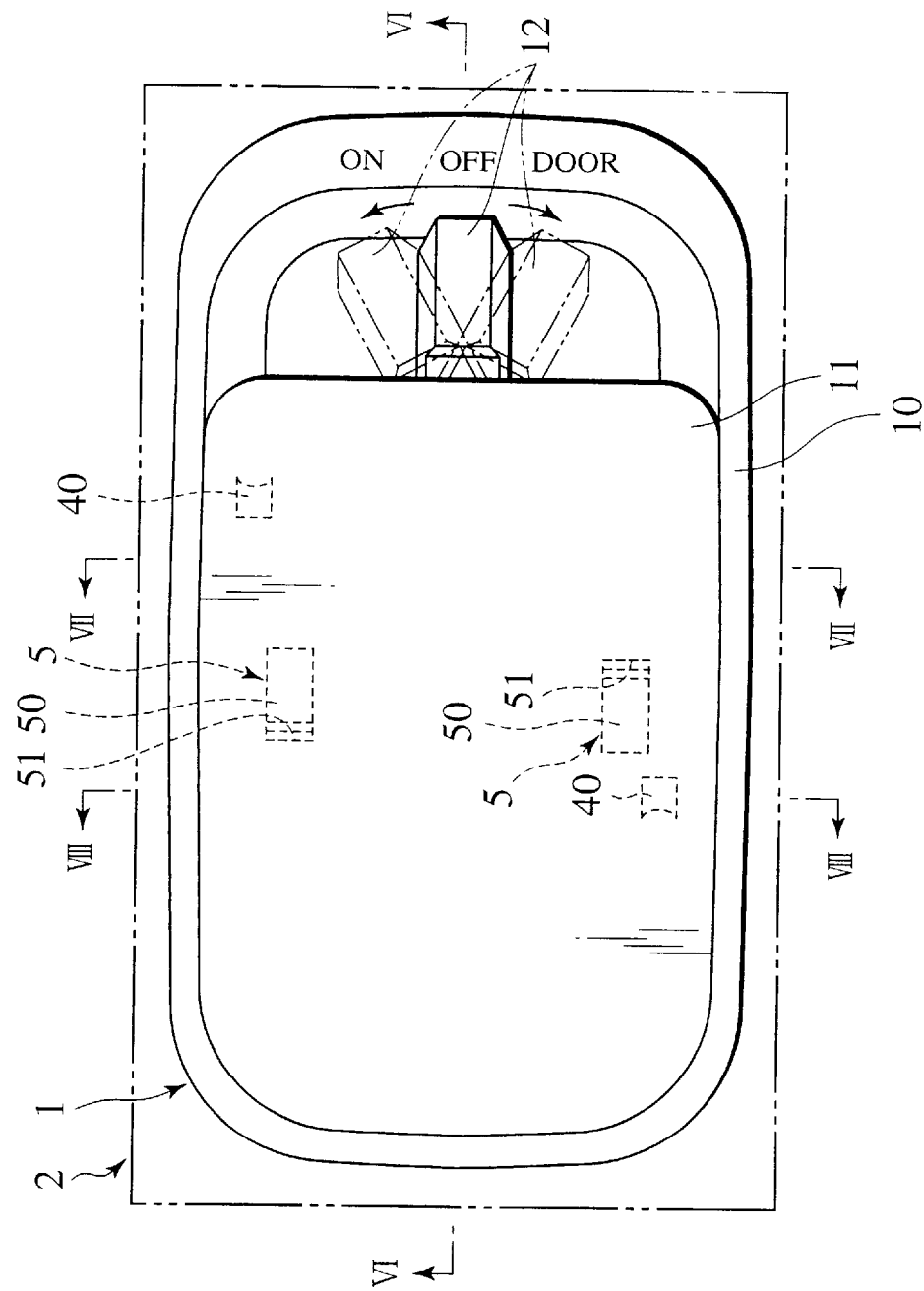
FIG. 19 is a plan view of a room lamp according to a third embodiment.

Furthermore, because the two primary fixing means 5 are positioned substantially on the diagonal line of the room lamp 1 that is in a rectangular shape (rectangular shape when viewed from below or above), it is possible to reliably prevent backlash (swinging) about a longitudinal axis or a width-direction axis of the room lamp 1. In the fixing structure of the room lamp of the invention, as shown in FIGS. 18 and 19, the two primary fixing means 5 may be positioned in the axial direction in the width direction or in the axial direction in the longitudinal direction.

The above roof trim 2 may be fixed to the roof framework 3 by fixing means other than the above primary fixing means 5 of the room lamp 1 in some cases. As the fixing means, there are fixing means of a map lamp, fixing means of lamps on left and right opposite sides at the rear of the room, fixing means of a roof grip member, and the like.

Second Embodiment

The room lamp 201 is formed of a lamp housing 210, a lens 211, a switching knob 212, and a light bulb 213 as shown in FIGS. 24, and 26 to 30.

Figure 26:
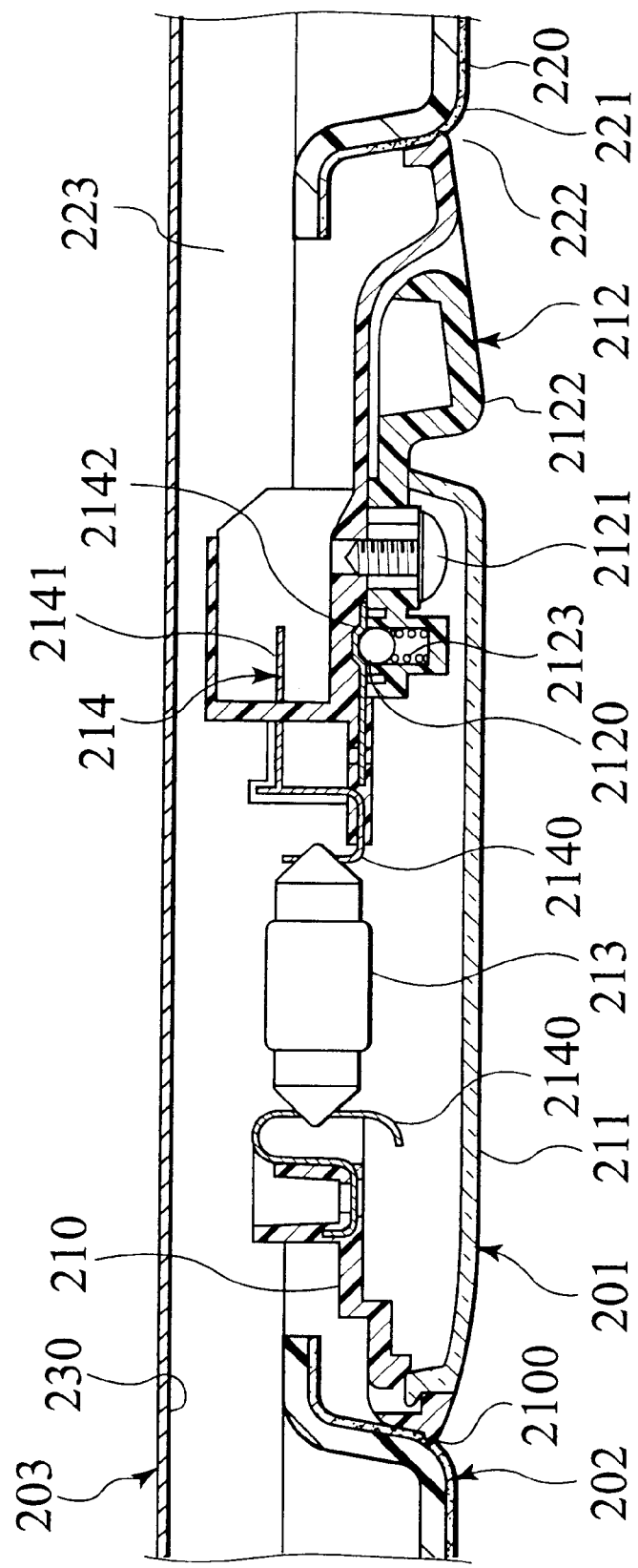
FIG. 26 is a sectional view taken along a line VIIa—VIIa in FIG. 24.
Figure 27:
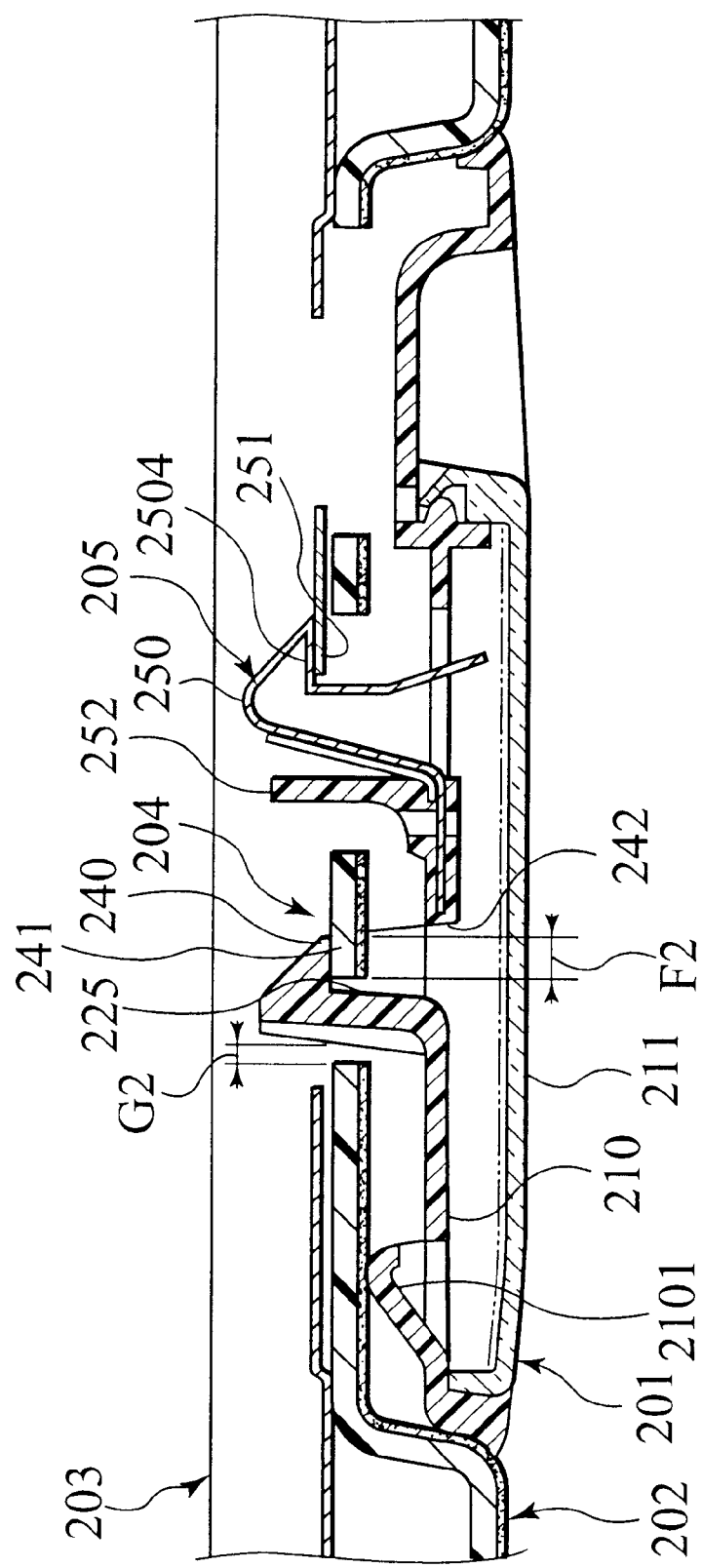
FIG. 27 is a sectional view taken along a line VIIIa—VIIIa in FIG. 24.
Figure 28:
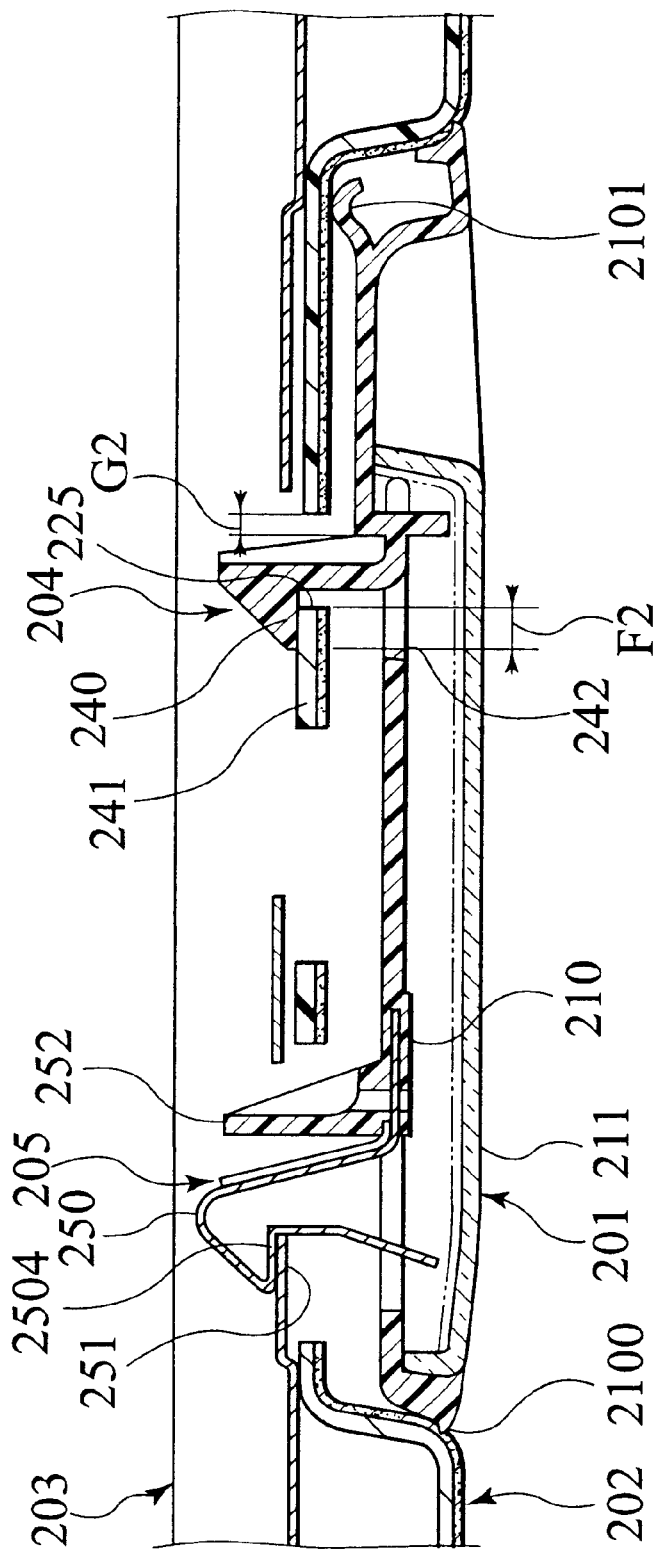
FIG. 28 is a sectional view taken along a line IXa—IXa in FIG. 24.
Figure 29:
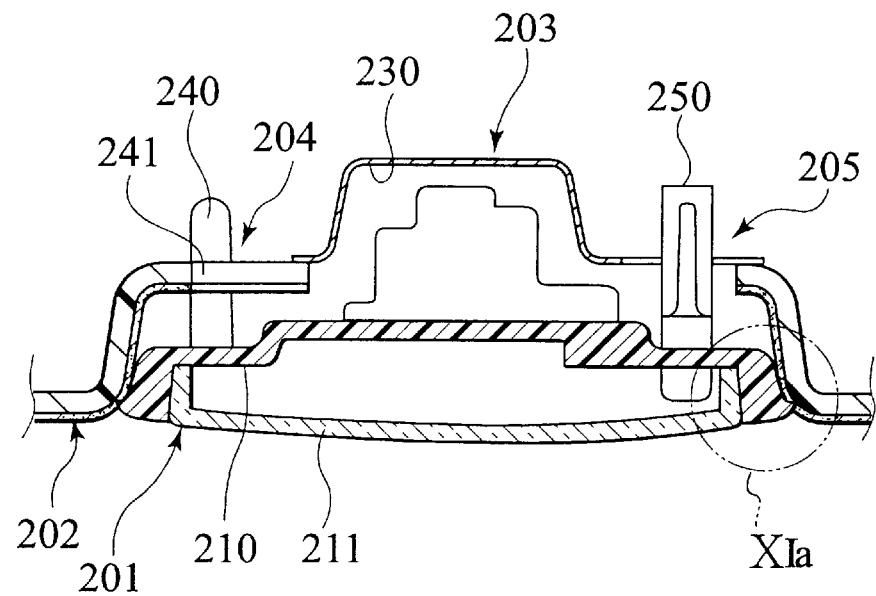
FIG. 29 is a sectional view taken along a line Xa—Xa in FIG. 24.

The above lamp housing 210 formed of an insulating member made of synthetic resin or the like is integrally provided by insert molding with two springs 250 of a primary fixing means, which will be described later, two holder parts 2140 for detachably holding the light bulb 213, three connector terminal parts 2141 electrically and detachably connected to a connector terminal (not shown, a connector terminal of a connector to which an electric source such as a battery of the automobile, an electric source linked with opening and closing of the door, and an earth are connected respectively and electrically) of a connector on an electric source side, three fixed contact parts 2142 electrically connected to each other to form predetermined electric circuits which will be described later by switching of a movable contact ball 2120 of the switching knob 212, wiring parts for carrying out wiring between the holder parts 2140, the connector terminal parts 2141, and the fixed contact parts 2142, and a shade part and/or a reflecting plate part (not shown), as shown in FIGS. 26 to 28.

The above two springs 250, two holder parts 2140, three connector terminal parts 2141, three fixed contact parts 2142, wiring parts, and shade part and/or reflecting plate part are respectively formed as a plurality of 214 having resiliency and electrical conductivity before the insert molding and are formed respectively by punching after the insert molding.

Although the above two springs 250 and other parts are integrally formed on the lamp housing 210 by the insert molding as described above, the springs 250 and the parts separate from the lamp housing 210 may be mounted to the lamp housing 210 by heat caulking, insertion, bonding, or the like after molding of the lamp housing 210.

Figure 30:
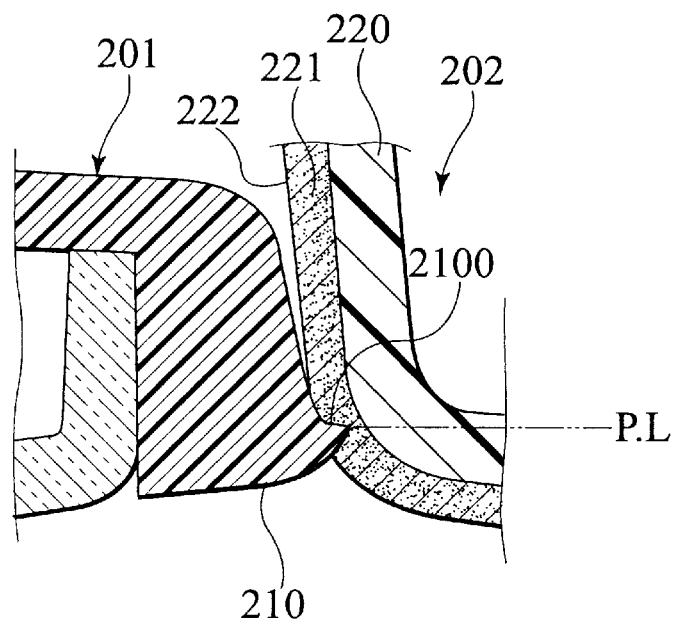
FIG. 30 is an enlarged sectional view of a part XIa in FIG. 29.

As shown in FIG. 30, a contact pawl 2100, or a pawl, is formed integrally at a peripheral part of the lamp housing 210 of the room lamp 201 on a parting line P.L. The contact pawl 2100 bites into and comes in contact with a covering member 221 at a peripheral part of a recessed part 222 of a roof trim 202 which will be described later so as to fill a gap between the room lamp 201 and the roof trim 202.

Furthermore, as shown in FIGS. 27 and 28, two resilient contact parts 2101 having a sectional shape of V with an obtuse angle are respectively and integrally formed in positions at a distance from each other on a diagonal line on an upper face (an upper face when the room lamp 201 is fixed to a roof of an inside of a vehicle) of the lamp housing 210 of the room lamp 201. The resilient contact parts 2101, or a resilient part, are for ensuring provisional fixing of the room lamp 201 and the roof trim 202 to each other by provisional fixing means 4 which will be described later.

Figure 24:
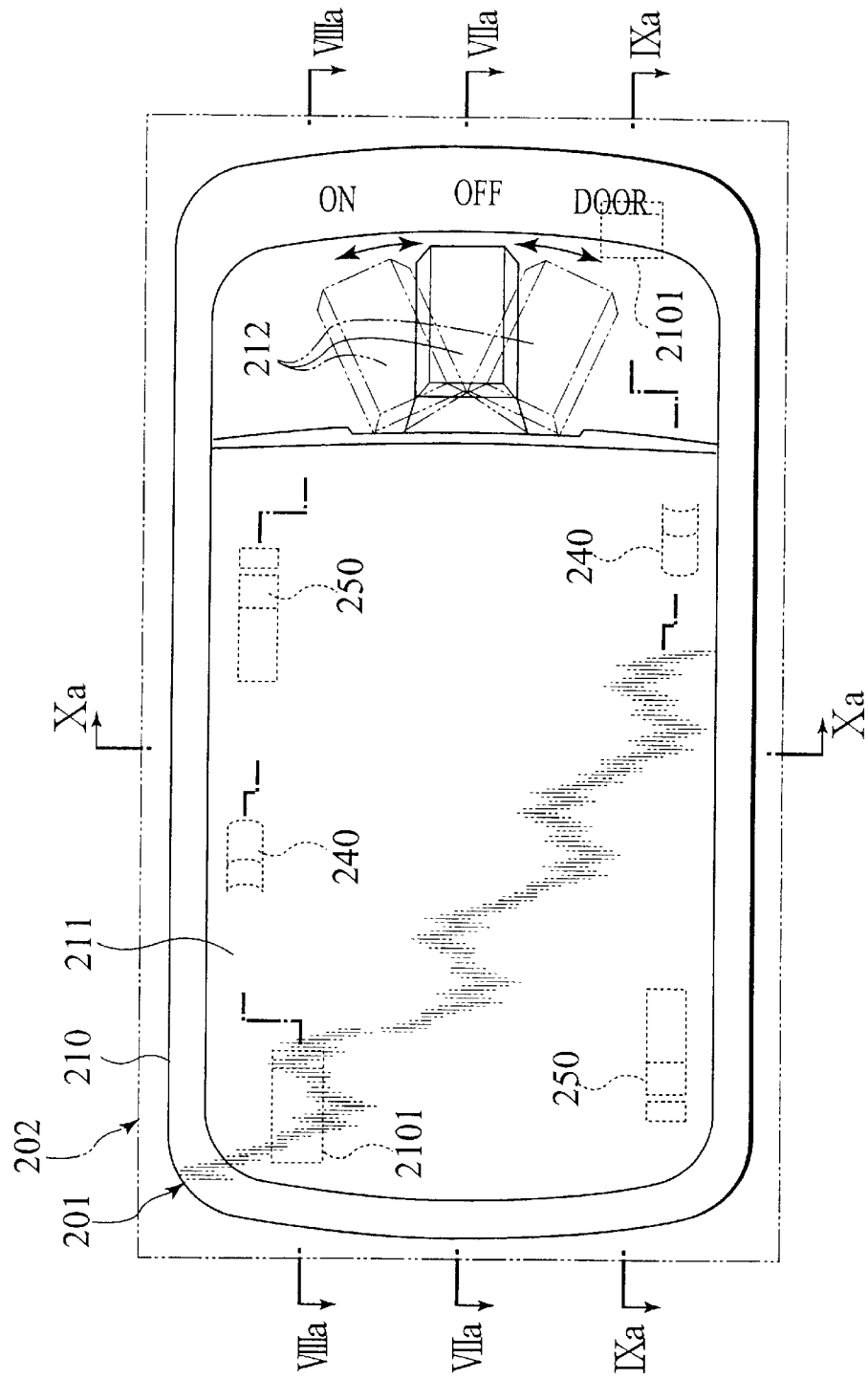
FIG. 24 is a view (bottom view) taken in a direction of an arrow Va in FIG. 22.

As shown in FIGS. 24 and 26 to 30, the above lens 211 is detachably mounted to a lower face of the lamp housing 210. As shown in FIGS. 24 and 26, the above switching knob 212 is rotatably mounted to a lower face of the lamp housing 210 by a screw 2121. A knob end part 2122 of the switching knob 212 projects to an outside from the lens 211. On the other hand, to an end part of the switching knob 212 on a side opposite to the knob end part 2122, the above movable contact ball 2120 is mounted through a coil spring 2123. The above light bulb 213 is detachably held by the holder parts 2140 as similarly shown in FIG. 26.

As shown in FIG. 24, if the switching knob 212 is positioned in an "OFF" position, the electric circuit is in an OFF state and the light bulb 213 is out. If the switching knob 212 is switched to an "ON" position, the electric circuit is brought into an ON state and the light bulb 213 comes on. If the switching knob 212 is switched to a "DOOR" position, an electric circuit is formed through a door. In this sate, if the door is closed, the electric circuit is in an OFF state and the light bulb 213 is out. On the other hand, if the door is opened, the electric circuit is brought into an ON state and the light bulb 213 comes on. In this manner, by switching the switching knob 212, the movable contact ball 2120 is switched and the above predetermined electric circuits are formed.

Figure 25:
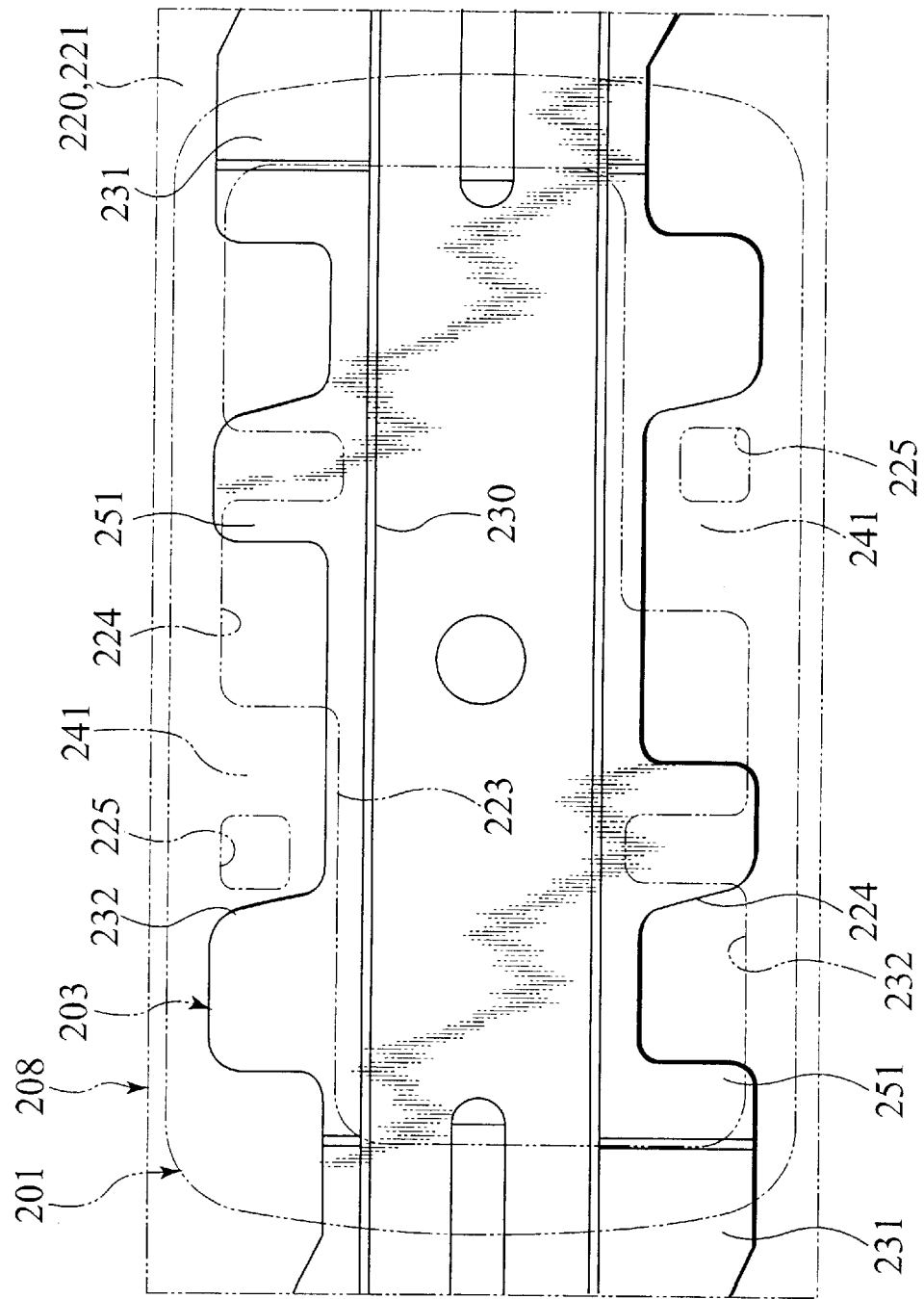
FIG. 25 is a view (bottom view) taken in a direction of an arrow Va in FIG. 22 and showing relative relationships of positions of the room lamp, roof trim, roof framework, provisions fixing means, and primary fixing means.

As shown in FIGS. 20 to 23A to 23C and 25 to 30, the roof trim 202 is mounted tautly to the roof in a room of the automobile and is formed of a base member 220 such as foamed urethane, for example, and a covering member 221 such as felt, for example, mounted tautly to a lower face of the base member 220. To a position of the roof trim 202 where the above room lamp 201 is set, a recessed part 222 for housing the room lamp is formed to be recessed upward. To a bottom part of the recessed part 222 of the roof trim 202, an opening part 223 is provided. The opening part 223 is provided at an edge thereof with rectangular notches 224 so as not to hinder fixing of the two springs 250 which will be described later and two fixing parts 251 of the roof framework 203 which will be described later to each other (see FIG. 25. In FIG. 25, a one-dot dashed line shows the room lamp 201, a chain double-dashed line shows the roof trim 202, and a solid line shows the roof framework 203, respectively).

As shown in FIGS. 25 to 29, in the roof framework 203, a recessed part 230 recessed upward at an intermediate part by presswork and the like and horizontal parts 231 on left and right opposite sides are respectively formed to extend in a longitudinal direction. The horizontal parts 231 of the roof framework 203 are provided with rectangular notches 232 such that two engagement pawls 240 of provisional fixing means 204 which will be described later and the roof framework 203 do not interfere with each other when the room lamp 201 and the roof trim 202 provisionally fixed to each other by the provisional fixing means 204 which will be described later are primarily fixed to the roof framework 203.

As shown in FIGS. 20 to 25 and 27 to 29, the room lamp 201 and the roof trim 202 are provided with the provisional fixing means 204 by which the room lamp 201 and the roof trim 202 are provisionally fixed to each other. The provisional fixing means 204 is formed of the engagement pawl 240 provided to the room lamp 201, an engagement part 241 provided to the roof trim 202, and a clearance G2 provided between the engagement pawl 240 and the engagement part 241 and for tolerating a displacement. The provisional fixing means 204 are provided in two positions in a vicinity of the switching knob 212 and in a position some distance from the switching knob 212.

The engagement part 241 is formed of an edge of a small rectangular through hole 225 provided to the roof trim 202.

On the other hand, the engagement pawl 240 is formed integrally to project upward from an upper face of the lamp housing 210 and the pawl 240 has a lance shape. In engaging the engagement pawl 240 with the engagement part 241, the edge of the through hole 225 of the roof trim 202 is resiliently deformed such that the engagement pawl 240 can be easily and reliably engaged with the engagement part 241. As shown in FIGS. 27 and 28, the engagement pawl 240 has a lap amount of a dimension F2 with respect to the above engagement part 241 of the roof trim 202. With the lap amount F2, provisional fixing force to a degree that the room lamp 201 and the roof trim 202 which are provisionally fixed to each other are not easily detached from each other until the room lamp 201 and the roof trim 202 are primarily fixed to the roof framework 203 can be obtained by the provisional fixing means 204. In FIGS. 27 and 28, a reference numeral 242 designates a through hole through which a molding die is drawn when the engagement pawl 240 is molded integrally to project from the lamp housing 210.

As shown in FIGS. 20 to 25 and 27 to 29, the room lamp 201 and the roof framework 203 are provided with primary fixing means 205 by which the room lamp 201 provisionally fixed to the roof trim 202 by the provisional fixing means 204 and the roof framework 203 are primarily fixed to each other. The primary fixing means 205 is formed of the spring 250 and a stopper 252 provided to the room lamp 201 and the fixing part 251 provided to the roof framework 203. The primary fixing means 205 are provided to two positions one of which is in a vicinity of the switching knob 212 and the other of which is some distance from the one on a diagonal line.

The fixing part 251 is formed of an edge of the notch 232 of the roof framework 203. The stopper 252 is integrally provided with the lamp housing 210 of the room lamp 201.

On the other hand, the spring 250 is integral with the metal plate 214 and is provided integrally with the lamp housing 210 of the room lamp 201 by insert molding. As shown in FIGS. 20 to 24, 27 to 29, and 31 to 36, the spring 250 is formed of a buried part 2500 horizontally buried in the lamp housing 210, a first resiliently deformed part 2501 and a rib 2503 formed by bending the spring 250 diagonally upward from the buried part 2500 into a V shape with an obtuse angle, a second resiliently deformed part 2502 formed by bending the spring 250 diagonally downward from the first resiliently deformed part 2501 into an inverted U shape, a pawl part 2504 formed by bending the spring 250 substantially horizontally from the second resiliently deformed part 2502, and an operation part 2505 formed by bending the spring 250 downward from the pawl part 2504 into a V shape with an obtuse angle.

In other words, the spring 250 includes:
the pawl part 2504 which is resiliently engaged with and which comes into contact with the fixing part 251 to primarily fix the room lamp 201 and the roof framework 203 to each other;
the first resiliently deformed part 2501 which is resiliently deformed about a first fulcrum O1 as a rotation center between a normal state (state shown in FIG. 31) of the spring 250 or a first sate (state shown in FIG. 36) in which the pawl part 2504 is resiliently engaged with and comes into contact with the fixing part 251 and a second state (state shown in FIGS. 32 and 35) in which the spring 250 is in contact with the stopper 252;

the second resiliently deformed part 2502 which is resiliently deformed about a second fulcrum O2 as a rotation center between the second state and a third state (state shown in FIGS. 33 and 34) in which the pawl part 2504 can be inserted into and pulled out of the fixing part 251; and the operation part 2505 for resiliently deforming the first resiliently deformed part 2501 and the second resiliently deformed part 2502.

Figure 36:
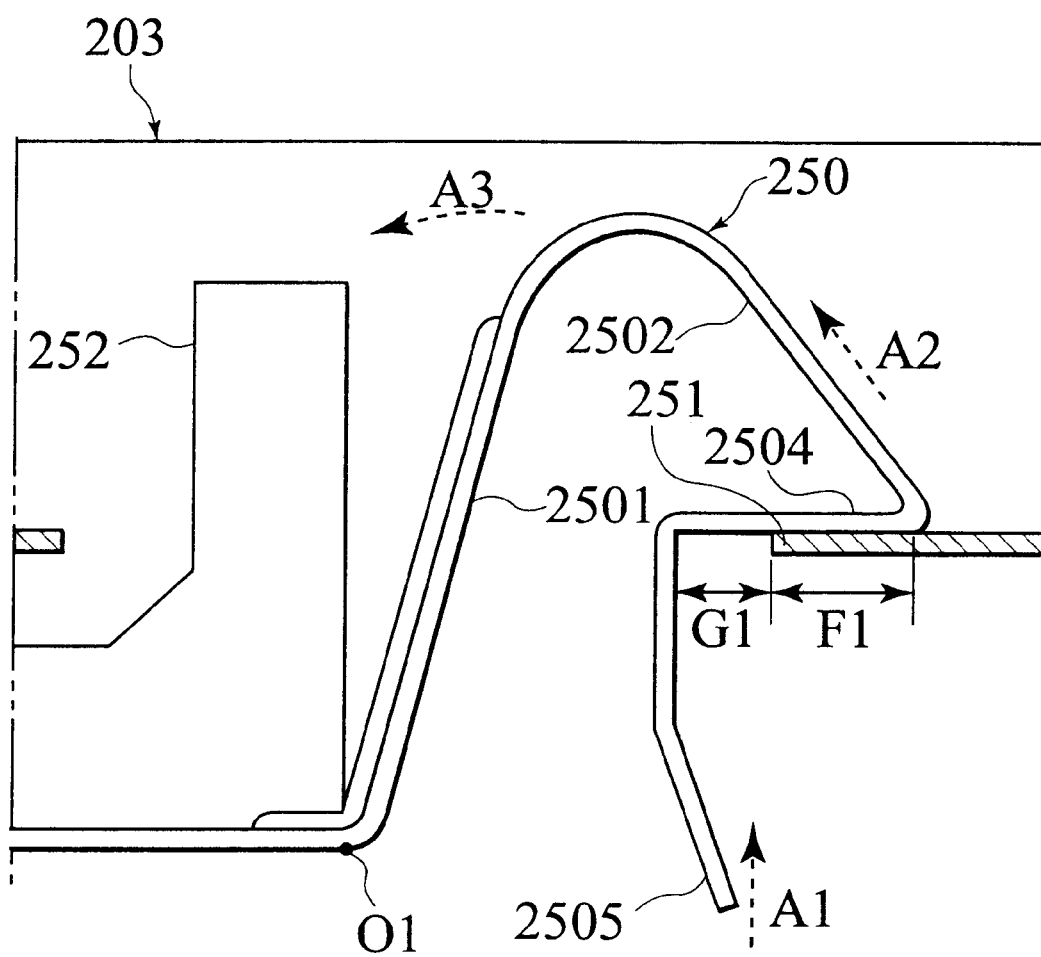
FIG. 36 is an enlarged side view of a state in which the operation part is operated when the pawl part is resiliently engaged and in contact with the fixing part (first state).

As shown in FIG. 36, the pawl part 2504 has a lap amount of a dimension F1 with respect to the above fixing part 251 of the roof framework 203. As similarly shown in FIG. 36, a clearance G1 for tolerating a displacement is provided between the pawl part 2504 and the fixing part 251.

The fixing structure of the room lamp of the invention in the present embodiment has the above-described structure. A fixing operation of the room lamp will be described below.

First, before supplying to the assembly line of the automobile, the engagement pawls 240 of the room lamp 201 are engaged with the engagement parts 241 of the roof trim 202 to provisionally fix the room lamp 201 and the roof trim 202 to each other by the provisional fixing means 204 (the engagement pawls 240 and the engagement parts 241).

At this time, the engagement pawl 240 is engaged with the engagement part 241 through the lap amount F2 and the clearance G2 for tolerating the displacement is formed between the engagement pawl 240 and the engagement part 241, that is, between a back face of the engagement pawl 240 and the edge of the through hole 225. The above lap amount F2 is larger than the clearance G2. The room lamp 201 is housed in the recessed part 222 of the roof trim 202, the contact pawl 2100 of the room lamp 201 comes into contact with the covering member 221 of the recessed part 222 of the roof trim 202, and the resilient contact part 2101 of the room lamp 201 resiliently comes into contact with a bottom part of the recessed part 222 of the roof trim 202. As a result, the engagement of the engagement pawl 240 and the engagement part 241 with each other is ensured and the room lamp 201 is brought into close contact with the roof trim 202 without a gap therebetween. On the other hand, the springs 250 of the primary fixing means 205 are positioned at the notches 224 of the roof trim 202 (see FIGS. 20, 21, and 27 to 29).

Then, a roof sub ASSY including the room lamp 201 and the roof trim 202 provisionally fixed to each other by the provisional fixing means 204 is supplied to the assembly line of the automobile. On this assembly line of the automobile, the springs 250 of the room lamp 201 are resiliently engaged with and brought into contact with the fixing parts 251 of the roof framework 203 to primarily fix the room lamp 201 and the roof trim 202 to the roof framework 203 by the primary fixing means 205 (the springs 250 and the fixing parts 251). At this time, the engagement pawls 240 do not interfere with the horizontal parts 231 of the roof framework 203 because of the notches 232 of the roof framework 203 (see FIGS. 21, 22, and 27 to 29).

As described above, by the fixing structure of the room lamp of the invention in the present embodiment, it is possible to simultaneously fix the roof trim 202 and the room lamp 201 to the roof framework 203 on the assembly line of the automobile. Therefore, it is possible to reduce the number of the man-hours required for assembly on the assembly line of the automobile.

Especially in the fixing structure of the room lamp of the invention in the present embodiment, by the two fulcrums, that is, the first fulcrum O1 and the second fulcrum O2 and the two resiliently deformed parts, that is, the first resiliently deformed part 2501 and the second resiliently deformed part 2502, it is easy to attach and detach the room lamp 201 and the roof trim 202 to and from the roof framework 203.

Figure 31:
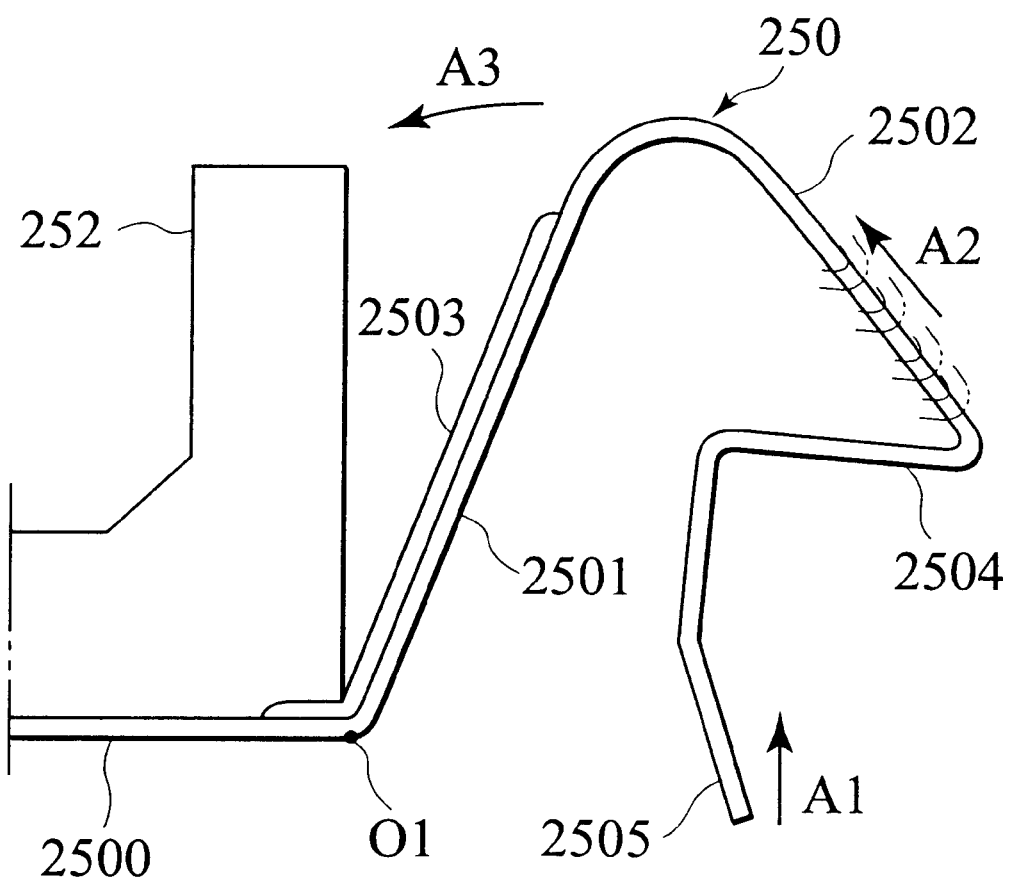
FIG. 31 is an enlarged side view of a state in which an operation part is operated when a spring is in a normal state (first state)

In other words, as shown in FIG. 31, in the normal state (first state) of the spring 250, the operation part 2505 is operated in a direction shown by an arrow A1 in a solid line (upward). Thus, the first resiliently deformed part 2501 is resiliently deformed in a direction shown by an arrow A3 in a solid line (counterclockwise) about the first fulcrum O1 as the rotation center. In synchronization with this, as shown by a broken line in FIG. 31, an corner part between the pawl part 2504 and the second resiliently deformed part 2502 moves in a direction shown by an arrow A2 in a solid line (counterclockwise) about the first fulcrum O1 as the rotation center.

Figure 32:
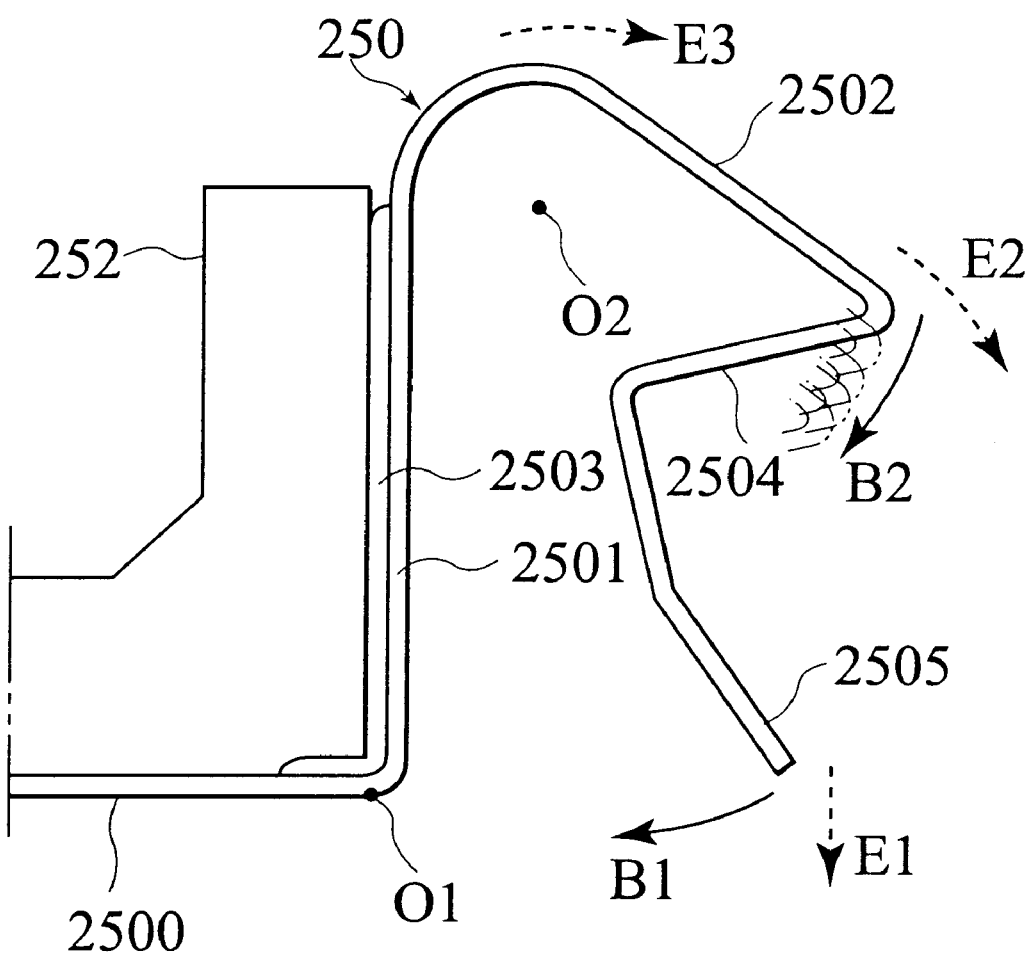
FIG. 32 is an enlarged side view of a state in which the operation part is further operated when a first resiliently deformed part is resiliently deformed and the spring comes into contact with the stopper (second state) or an enlarged side view of a state in which the first resiliently deformed part resiliently returns to the first state shown in FIG. 31.

Next, as shown in FIG. 32, when the first resiliently deformed part 2501 is resiliently deformed and the first resiliently deformed part 2501 is brought into contact with the stopper 252 through the rib 2503 of the spring 250 (the second state), the operation part 2505 is operated in a direction shown by an arrow B1 in a solid line (leftward). As a result, the second resiliently deformed part 2502 is resiliently deformed in a direction shown by an arrow B2 in a solid line (clockwise) about the second fulcrum O2 as the rotation center and synchronously with this, as shown by a broken line in FIG. 32, the corner part between the pawl part 2504 and the second resiliently deformed part 2502 moves similarly in the direction shown by the arrow B2 in the solid line (clockwise) about the second fulcrum O2 as the rotation center.

Figure 33:
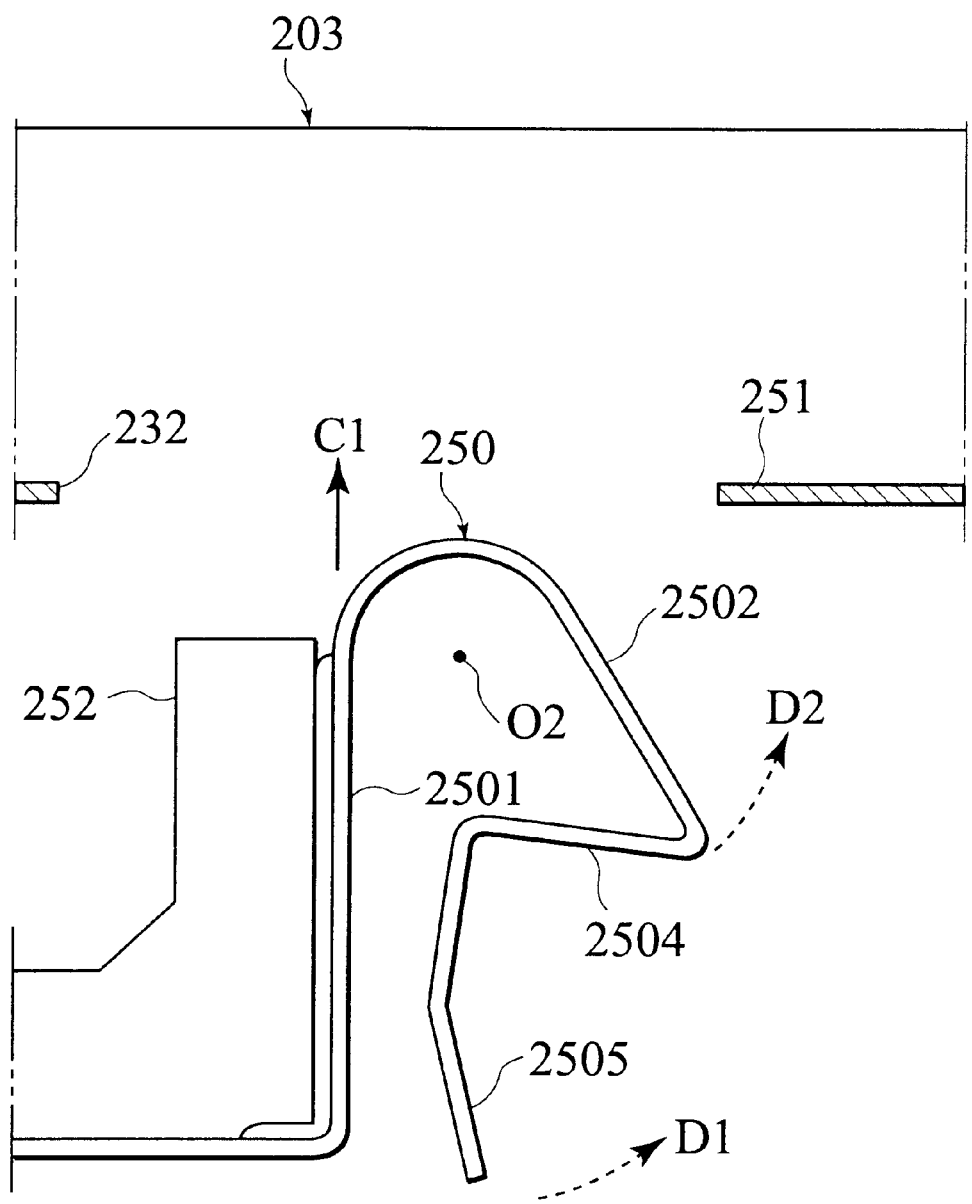
FIG. 33 is an enlarged side view of a state in which a second resiliently deformed part is resiliently deformed such that a pawl part can be set into a fixing part (third state) or an enlarged side view of a state in which the second resiliently deformed part resiliently returns to the second state shown in FIG. 32.

Then, as shown in FIG. 33, when the second resiliently deformed part 2502 is resiliently deformed such that the pawl part 2504 can be set into the fixing part 251, that is, that the pawl part 2504 can be inserted into the notch 232 of the roof framework 203 (the third state), the pawl part 2504 is set into the fixing part 251 in a direction shown by an arrow C1 in a solid line while maintaining the third state.

Figure 34:
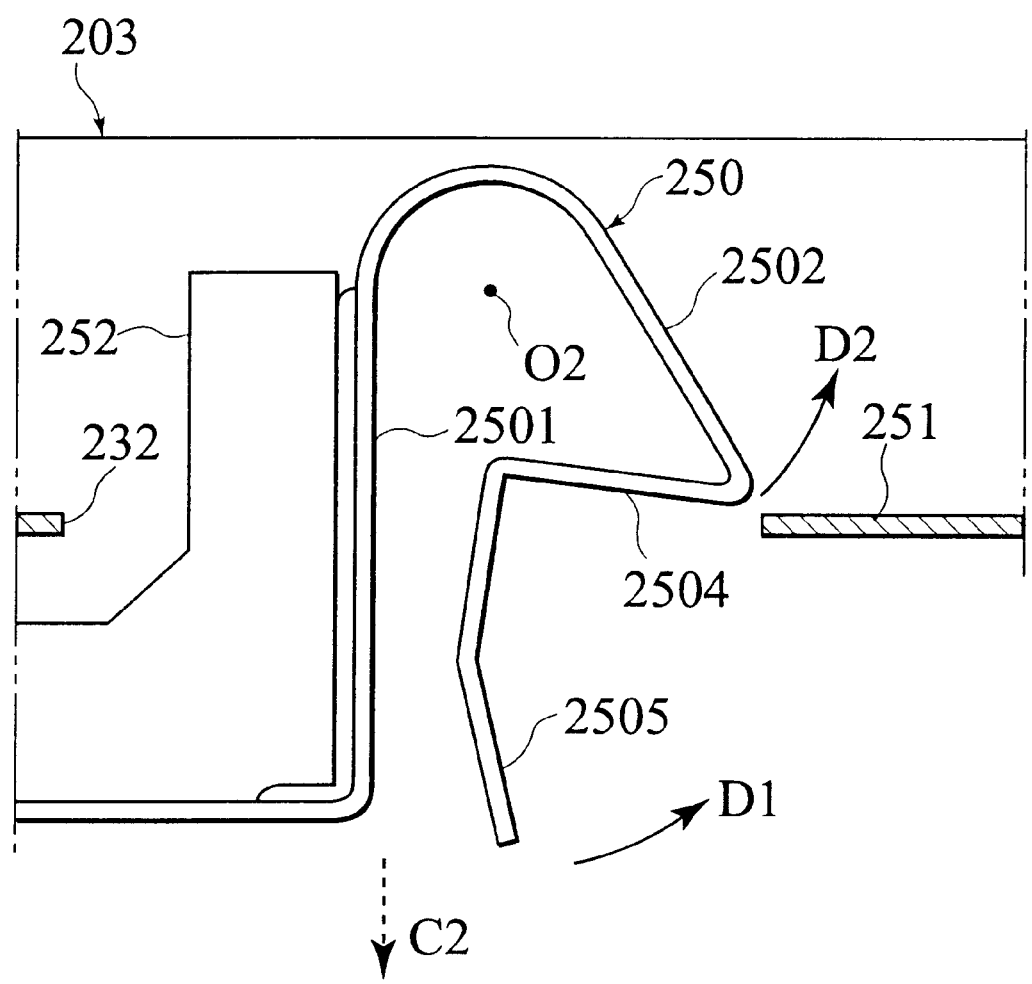
FIG. 34 is an enlarged side view of a state in which the operation of the operation part is stopped when the pawl part is set into the fixing part and the second resiliently deformed part resiliently returns or an enlarged side view of a state in which the second resiliently deformed part is resiliently deformed such that the pawl part can be pulled out of the fixing part (third state)

Next, if the operation of the operation part 2505 is stopped in a state in which the pawl part 2504 is set into the fixing part 251 as shown in FIG. 34, the second resiliently deformed part 2502 resiliently returns to its original state (the state shown in FIG. 33) in a direction shown by an arrow D2 in a solid line (counterclockwise) about the second fulcrum O2 as the rotation center. In synchronization with this, the corner part between the second resiliently deformed part 2502 and the pawl part 2504 moves in the same direction and the operation part 2505 moves in a direction shown by an arrow D1 in a solid line (counterclockwise).

Figure 35:
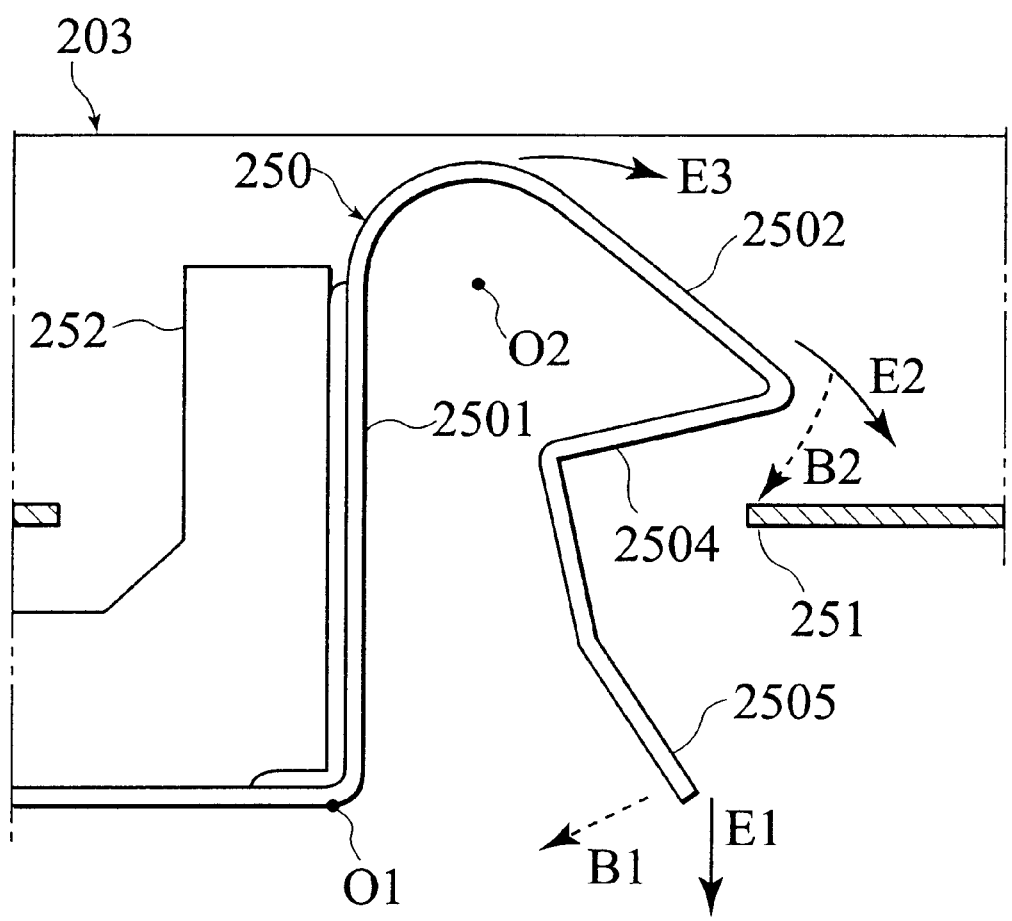
FIG. 35 is an enlarged side view of a state in which the operation of the operation part is stopped and the first resiliently deformed part resiliently returns or an enlarged side view of a state in which the operation part is further operated when the first resiliently deformed part is resiliently deformed and the spring comes into contact with the stopper (second state)

Then, as shown in FIG. 35, the first resiliently deformed part 2501 resiliently returns to its original state (the state shown in FIG. 31) in a direction shown by an arrow E3 in a solid line (clockwise) about the first fulcrum O1 as the rotation center. In synchronization with this, the corner part between the second resiliently deformed part 2502 and the pawl part 2504 moves in a direction shown by an arrow E2 in a solid line (clockwise) about the first fulcrum O1 as the rotation center and the operation part 2505 moves in a direction shown by an arrow E1 in a solid line (downward).

Then, as shown in FIG. 36, the pawl part 2504 of the spring 250 is resiliently engaged with and comes into contact with the fixing part 251 through the lap amount F1 (the first state). As a result, the room lamp 201 and the roof trim 202 are simultaneously and primarily fixed to the roof framework 203. At this time, the clearance G1 for tolerating the displacement is provided between the pawl part 2504 and the fixing part 251, that is, between a vertical part of the spring 250 between the pawl part 2504 and the operation part 2505 and an end part of the fixing part 251. The above lap amount F1 is larger than the clearance G1.

In order to detach the room lamp 1 and the roof trim 202 from the roof framework 203, as shown in FIG. 36, the operation part 2505 is operated in a direction shown by an arrow A1 in a broken line (upward) when the pawl part 2504 is resiliently engaged with and in contact with the fixing part 251 (the first state). As a result, the first resiliently deformed part 2501 is resiliently deformed in a direction shown by an arrow A3 in a broken line (counterclockwise) about the fist fulcrum O1 as the rotation center. In synchronization with this, the corner part between the pawl part 2504 and the second resiliently deformed part 2502 moves in a direction shown by an arrow A2 in a broken line (counterclockwise) about the first fulcrum O1 as the rotation center.

Next, as shown in FIG. 35, when the first resiliently deformed part 2501 is resiliently deformed and the first resiliently deformed part 2501 comes into contact with the stopper 252 through the rib 2503 through the spring 250 (the second state), the operation part 2505 is operated in a direction shown by a narrow B1 in a broken line (leftward). Thus, the second resiliently deformed part 2502 is resiliently deformed in a direction shown by an arrow B2 in a broken line (clockwise) about the second fulcrum O2 as the rotation center. In synchronization with this, the corner part between the pawl part 2504 and the second resiliently deformed part 2502 moves similarly in the direction shown by the arrow B2 in the broken line (clockwise) about the second fulcrum O2 as the rotation center.

Then, as shown in FIG. 34, when the second resiliently deformed part 2502 is resiliently deformed such that the pawl part 2504 can be set into the fixed part 251, that is, that the pawl part 2504 can be pulled out of the notch 232 of the roof framework 203 (the third state), the pawl part 2504 is pulled out of the fixing part 251 in a direction sown by an arrow C2 in a broken line while maintaining the third state.

Next, as shown in FIG. 33, if the operation of the operation part 2505 is stopped in a state in which the pawl part 2504 is pulled out of the fixing part 251, the second resiliently deformed part 2502 resiliently returns to its original state (the state shown in FIG. 35) in a direction shown by an arrow D2 in a broken line (counterclockwise) about the second fulcrum O2 as the rotation center. In synchronization with this, the corner part between the second resiliently deformed part 2502 and the pawl part 2504 moves in the same direction and the operation part 2505 moves in a direction shown by an arrow D1 in a broken line (counterclockwise).

Furthermore, as shown in FIG. 32, the first resiliently deformed part 2501 resiliently returns to its original state (the state shown in FIG. 36) in a direction shown by an arrow E3 in a broken line (clockwise) about the first fulcrum O1 as the rotation center. In synchronization with this, the corner part between the second resiliently deformed part 2502 and the pawl part 2504 moves in a direction shown by an arrow E2 in a broken line (clockwise) about the first fulcrum O1 as the rotation center and the operation part 2505 moves in a direction shown by an arrow E1 in a broken line (downward).

Then, as shown in FIG. 31, the spring 250 is brought into the normal state (the first state). As a result, the room lamp 201 and the roof trim 202 are detached from the roof framework 203.

As described above, it is easy to mount and detach the room lamp 201 and the roof trim 202 to and from the roof framework 203. Loci of the resilient deformation and the resilient return of the first resiliently deformed part 2501 and the second resiliently deformed part 2502 about the first fulcrum O1 and the second fulcrum O2 as the rotation centers are illustrated separately as shown in FIGS. 31 to 36 but are considered to be compound in actuality.

Moreover, in the fixing structure of the room lamp of the invention in the present embodiment, the displacement between the pawl part 2504 and the fixing part 251 can be tolerated by the clearance G1 formed between the pawl part 2504 of the room lamp 1 and the fixing part 251 of the roof framework 203. Therefore, it is possible to sufficiently tolerate a dimensional tolerance of the primary fixing means 205, such as the displacement between the room lamp 201 and the roof framework 203 (displacements of the room lamp 201 in longitudinal and width directions and about a vertical axis), thereby reliably fixing the room lamp 201 and the roof trim 202 to the roof framework 203.

Especially in the present embodiment, since the room lamp 201 and the roof trim 202 are mounted to and detached from the roof framework 203 by using the two fulcrums, that is, the first fulcrum O1 and the second fulcrum O2 and the two resiliently deformed parts, that is, the first resiliently deformed part 2501 and the second resiliently deformed part 2502, a distance moved by the corner part between the second resiliently deformed part 2502 and the pawl part 2504 can be increased even if distances rotated by the first resiliently deformed part 250 and the first resiliently deformed part 2501 and the second resiliently deformed part 2502 about the respective fulcrums O1 and O2 are small. As a result, rotating spaces of the first resiliently deformed part 2501 and the second resiliently deformed part 2502 can be reduced and therefore, the roof framework 23, that is, the vehicle body can be miniaturized. On the other hand, it is possible to increase the lap amount F1 through which the pawl part 2504 and the fixing part 251 are resiliently engaged and in contact with each other, and therefore, the primarily fixed state of the room lamp 201 and the roof trim 202, and the roof framework 203 to each other can be stabilized.

In the embodiment, as shown in FIG. 24, since the one provisional fixing means 204 and the one primary fixing means 205 are provided in the vicinity of the switching knob 212, a length of an arm of rotation moment between the provisional fixing means 204 and primary fixing means 205, and the switching knob 212 is small. As a result, the fixed state of the room lamp 201, the roof trim 202, and the roof framework 203 to each other can sufficiently resist impact of switching operation of the switching knob 212.

Furthermore, in the embodiment, as similarly shown in FIG. 24, since the two provisional fixing means 205 are positioned substantially on the diagonal line of the room lamp 201 that is in a rectangular shape (rectangular shape when viewed from below or above), it is possible to reliably prevent backlash (swinging) about a longitudinal axis or a width-direction axis of the room lamp 201. In the fixing structure of the room lamp of the invention, the two provisional fixing means 205 may be positioned in the axial direction in the width direction or in the axial direction in the longitudinal direction.

Moreover, in the embodiment, as shown in FIGS. 27 and 28, the displacement between the engagement pawl 240 and the engagement part 241 can be tolerated by the clearance G2 formed between the engagement pawl 240 of the room lamp 201 and the engagement part 241 of the roof trim 202. Therefore, it is possible to sufficiently tolerate dimensional variation of the provisional fixing means 204, such as the displacement between the room lamp 201 and the roof trim 202 (displacements of the room lamp 201 in longitudinal and width directions and about a vertical axis), thereby reliably fixing the room lamp 201 and the roof trim 202 to each other.

Figure 20:
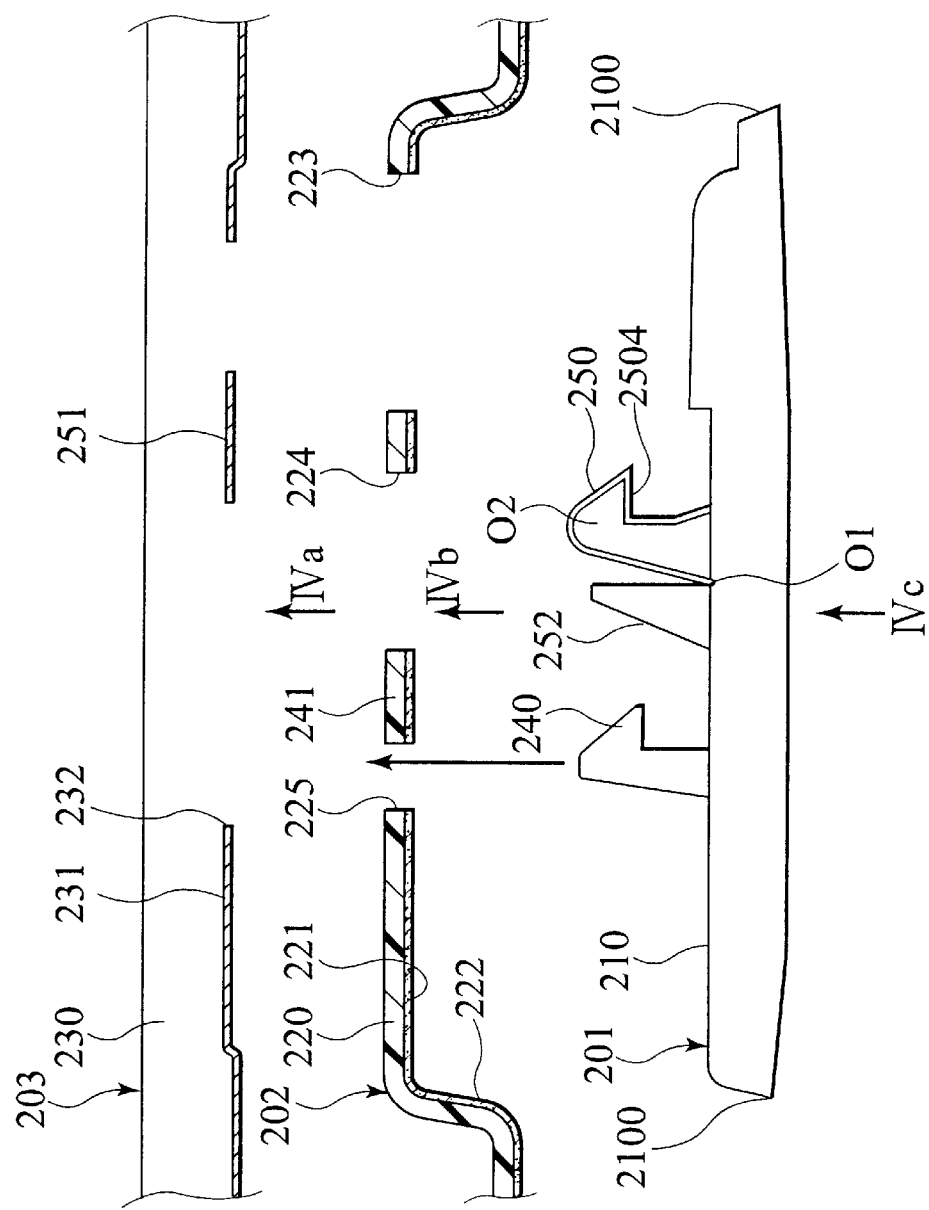
FIG. 20 is a vertical sectional view showing an embodiment of a fixing structure of a room lamp of the present invention and showing a state before fixing of the room lamp, a roof trim, and a roof framework.
Figure 21:
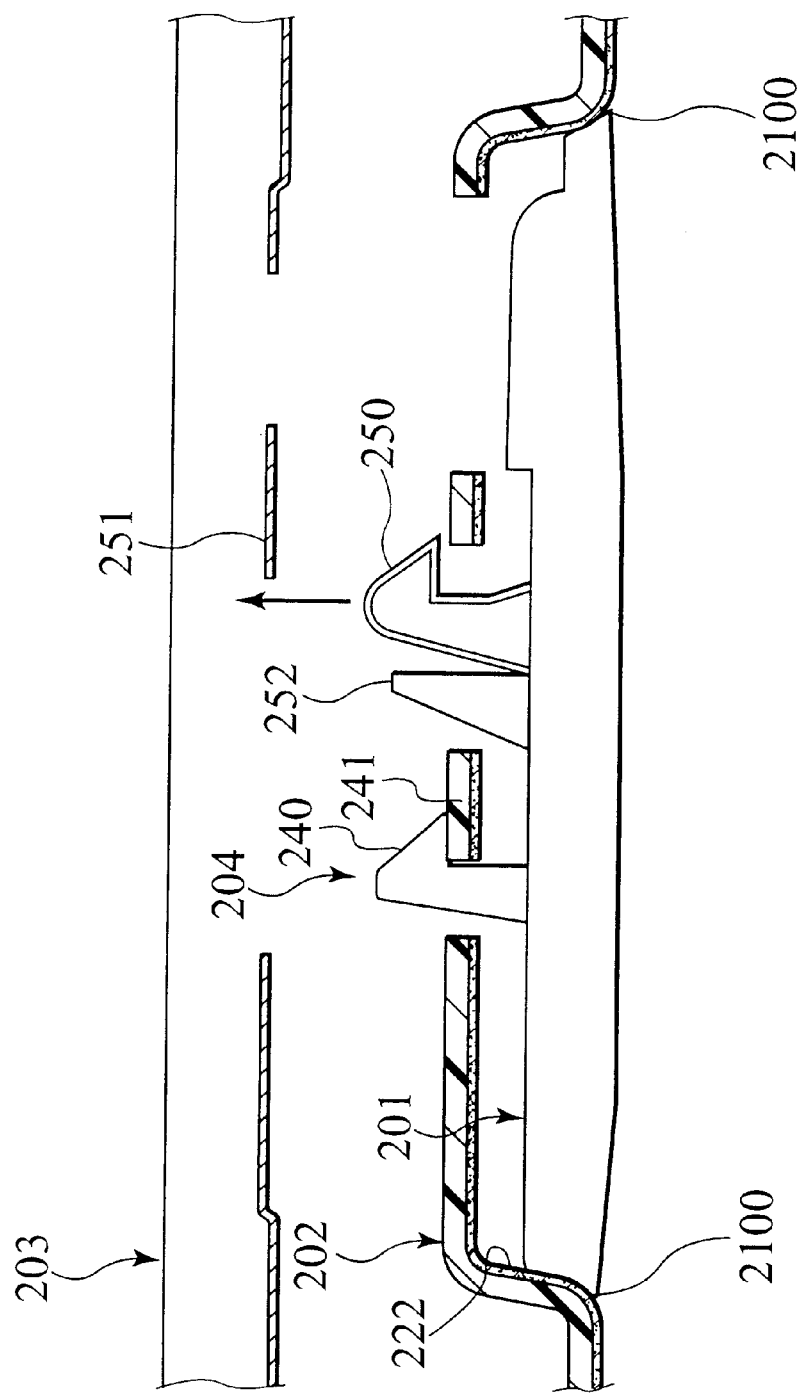
FIG. 21 is a vertical sectional view showing a state of provisional fixing of the room lamp and the roof trim to each other.
Figure 22:
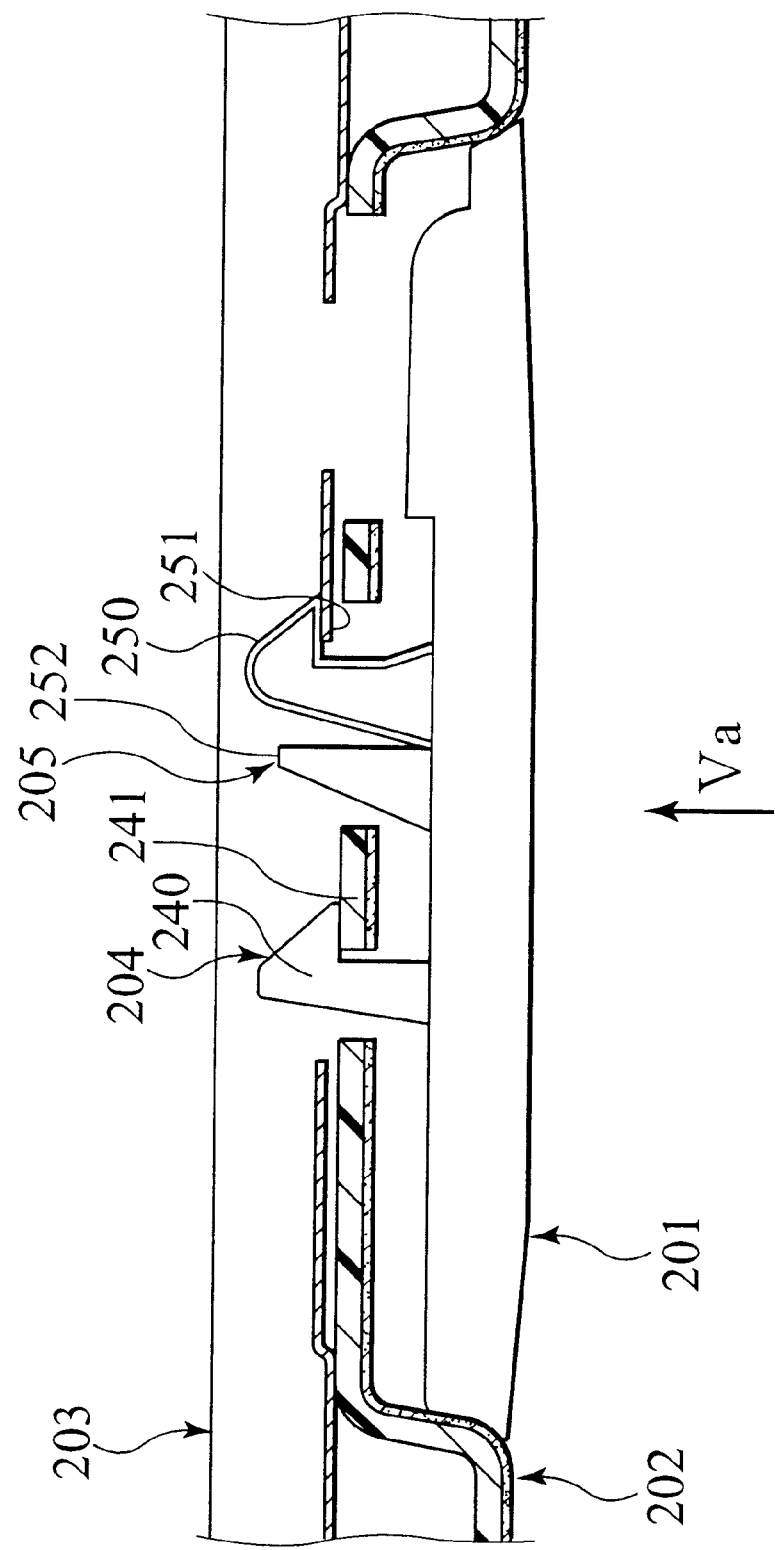
FIG. 22 is a vertical sectional view showing a state of primary fixing of the room lamp and the roof trim to the roof framework.
Figure 23A:
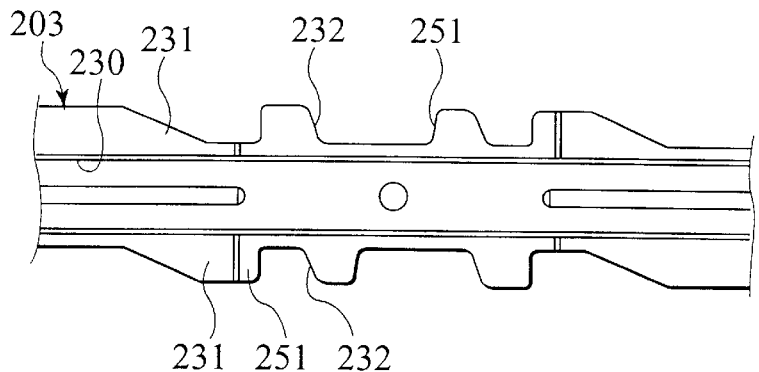
FIG. 23A is a view (bottom view) taken in a direction of an arrow IVa in FIG. 20.
Figure 23B:
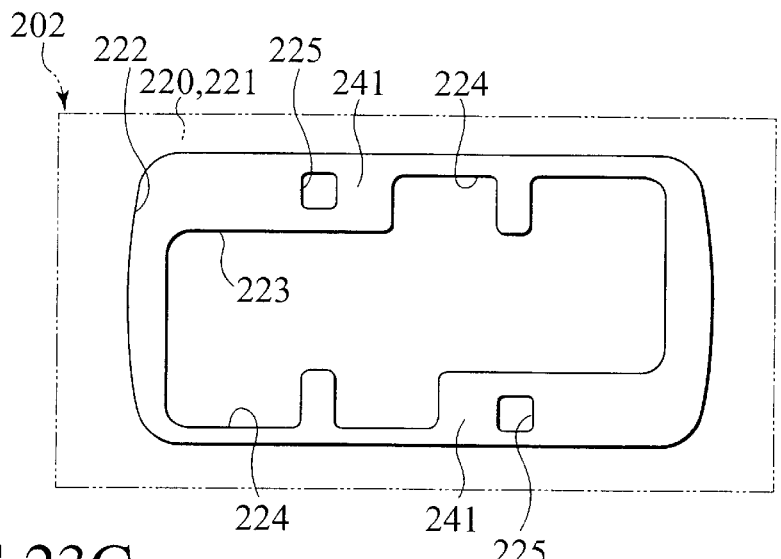
FIG. 23B is a view (bottom view) taken in a direction of an arrow IVb in FIG. 20.
Figure 23C:
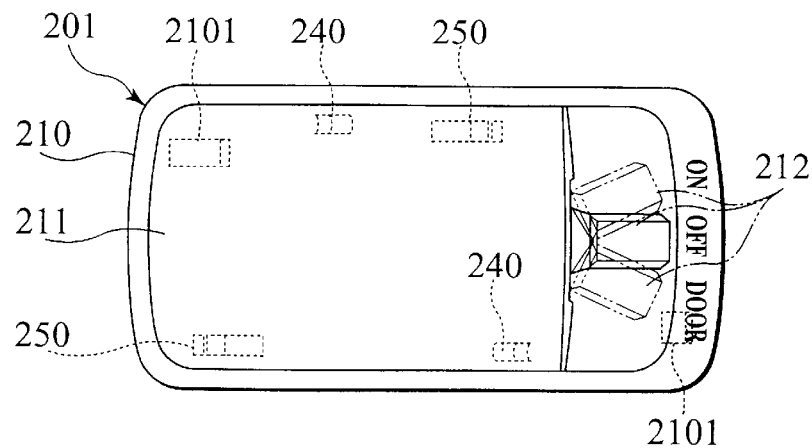
FIG. 23C is a view (bottom view) taken in a direction of an arrow IVc in FIG. 20.

In FIGS. 20 to 22, the provisional fixing means 204 and the primary fixing means 205 on the front side are shown and the provisional fixing means 204 and the primary fixing means 205 on the rear side are not shown. The above roof trim 202 may be fixed to the roof framework 203 by fixing means other than the above primary fixing means 205 of the room lamp 201 in some cases. As the fixing means, there are fixing means of a map lamp, fixing means of lamps on left and right opposite sides at the rear of the room, fixing means of a roof grip member, and the like.

What is claimed is:

1. A structure for fixing a room lamp to a vehicle comprising:
    a roof frame member;
    a room lamp mounted to the roof frame member, the room lamp including a light source, and a housing accommodating the light source therein;
    a roof trim member provided between the housing and the roof frame member;
    a first locking mechanism connected to the housing and the roof trim member, the first locking mechanism fixing the housing and the roof trim member to each other; and
    a second locking mechanism connected to the housing and the roof frame member, the second locking member extending through the roof trim member and fixing the room lamp and the roof frame member to each other.

2. A structure according to claim 1, wherein the second locking mechanism comprises:
    a resilient member fixed to the housing; and
    a through-hole defined by the roof frame member, the resilient member allowing a positional displacement between the through-hole and the resilient member.

3. A structure according to claim 2, wherein the resilient member is formed of an electrically conductive plate and is insert molded to the lamp housing, and a resilient and electrically conductive plate member, and wherein the plate member comprises one of the resilient member, a holder part, a connector terminal part, a fixed contact part, a wiring part, a shade part, and a reflecting part.

4. A structure according to claim 1, wherein the housing has a rectangular shape, and wherein a pair of second locking mechanisms are arranged diagonally with respect to the rectangular shaped housing.

5. A structure according to claim 1, wherein the first locking mechanism comprises:
    an engagement pawl integrally provided to the housing; and
    an engagement hole provided to the roof trim member.

6. A structure according to claim 1, wherein the first locking mechanism and second locking mechanism are each positioned in a vicinity of a switching knob of the room lamp.

7. A method of fixing a room lamp to a vehicle comprising the steps of:
    providing a room lamp including a light source, and a housing accommodating the light source therein;
    providing the housing and a roof trim member with a first locking mechanism;
    providing the housing and a roof frame member with a second locking mechanism;
    connecting the first locking mechanism to fix the room lamp and the roof trim member to each other with the second locking mechanism passing through the roof trim member;
    providing the roof trim member between the housing and the roof frame member; and
    connecting the second locking mechanism to fix the housing, which is fixed to the roof trim member, and the roof frame member to each other, with the second locking mechanism passing through the roof trim member.

8. A structure according to claim 1, wherein:
    the second locking mechanism comprises:
        a resilient member provided to the housing and a stopper; and
        a fixing part provided to the roof frame member, and wherein: the resilient member comprises:
        a pawl part to be brought in contact with the fixing part to be resiliently engaged therewith for fixing the housing and the roof frame member to each other;
        a first resilient part to be deformed, the first resilient part to pivot on a first fulcrum and between a first state and a second state to be deformed, the first state where the pawl part of the resilient member in a normal state is brought in contact with the fixing part to be resiliently engaged therewith, the second state where the resilient member is abutted against the stopper; and
        a second resilient part to be deformed, the second resilient part to rotate about a second fulcrum and between the second state and a third state to be deformed, the third state where the pawl part is to be inserted in the fixing part; an operation part for resiliently deforming the first resilient part and the second resilient part, the pawl part and the fixing part having a clearance therebetween for allowing a positional displacement therebetween.

9. A structure according to claim 8, wherein:
    the resilient member is insert molded in the housing of the room lamp with a holder part, a connector terminal part, a fixed contact part, a wiring part, and a reflecting plate part,
    the resilient member is formed of a resilient and electrically conductive metal plate, and
    the resilient member is formed by stamping with one of the holder part, the connector terminal part, the fixed contact part, the wiring part, and the reflecting plate part, after insert molding.

10. A structure according to claim 8, wherein the roof trim member has a recessed part for accommodating the housing, and wherein the housing has a pawl for latching with a side of the recessed part.

11. A structure according to claim 8, wherein the roof trim member has a recessed part for accommodating the housing, the housing has a resilient part to be resiliently brought in contact with a bottom of the recessed part under pressure for pressing the pawl part of the resilient member and the fixing part against each other.

12. A structure according to claim 8, wherein the first locking mechanism comprises an engagement part provided to the roof trim member; and an engagement pawl fixed to the housing, the engagement pawl being locked with the engagement part for fixing the housing and the roof trim member to each other, the engagement pawl and the engagement part having a clearance therebetween for allowing a positional displacement therebetween.

13. A structure according to claim 1, wherein the second locking mechanism comprises:
   a second engagement part provided to the roof frame member; and
   a second latch member fixed to the housing, the second latch member to be inserted in the second engagement part for locking, the second latch member having a pawl part for locking with the second engagement part, the second latch member having a first part to be deformed, the first part having a proximal end on the housing, the first part extending from the proximal end in an oblique direction relative to an insertion direction of the second latch member, the first part to pivot on the proximal end for releasing the pawl part from the second engagement part, the second latch member having a second part to be deformed, the second part extending from a distal end of the first part to the pawl part, the second part to rotate for positioning the pawl part off the second engagement part of the roof frame member in a crossing direction relative to the insertion direction.

14. A structure according to the claim 13, wherein the second locking mechanism comprises a stopper extending from the housing in the insertion direction, the stopper for the first part to be abutted against and for stopping to rotate the first part.

15. A structure according to claim 13, wherein the pawl part and the second engagement part have a second clearance therebetween for allowing a second positional displacement therebetween in a crossing direction to the insertion direction of the second latch member.

16. A structure according to claim 13, wherein the second latch member comprises an operation part extending from the pawl part, the operation part for pivoting the first part and rotating the second part.

17. A structure according to claim 13, wherein the first locking mechanism comprises a first engagement part provided to the roof trim member; and a first latch member fixed to the housing, the first latch member to be inserted in the roof trim member for locking with the first engagement part, the first engagement part and the first latch member having a first clearance therebetween for allowing a first positional displacement therebetween in a crossing direction relative to an insertion direction of the first latch member.

18. A structure for fixing a room lamp to a vehicle comprising:
   a roof frame member;
   a room lamp, the roof lamp including a light source and a housing accommodating the light source therein;
   a roof trim member interposed between the housing and the roof frame member;
   a first locking mechanism which extends from the housing and interconnects the housing and the roof trim member; and
   a second locking mechanism which extends from housing and interconnects the room lamp and the roof frame, the second locking mechanism extending through the roof trim member.

19. A method of fixing a room lamp to a vehicle comprising the steps of:
   fixing a housing of the room lamp to a roof trim member using a first locking mechanism; and subsequently
   fixing the housing and the roof trim member, which is connected to the housing by the first locking mechanism, to a frame member using a second locking mechanism which passes through the roof trim member.

* * * * *